US008007577B2

(12) United States Patent
Gotoh

(10) Patent No.: US 8,007,577 B2
(45) Date of Patent: Aug. 30, 2011

(54) INK, COLOR FILTER, AND METHOD FOR MANUFACTURING THE SAME, AND DISPLAY DEVICE

(75) Inventor: Hidenori Gotoh, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 374 days.

(21) Appl. No.: 12/158,011

(22) PCT Filed: Dec. 20, 2006

(86) PCT No.: PCT/JP2006/325379
§ 371 (c)(1),
(2), (4) Date: Jun. 18, 2008

(87) PCT Pub. No.: WO2007/077738
PCT Pub. Date: Jul. 12, 2007

(65) Prior Publication Data
US 2009/0176914 A1    Jul. 9, 2009

(30) Foreign Application Priority Data
Dec. 28, 2005 (JP) ................................. 2005-380197

(51) Int. Cl.
*C09D 11/00* (2006.01)
(52) U.S. Cl. ....... 106/31.6; 106/31.78; 524/81; 524/105
(58) Field of Classification Search ................. 106/31.6, 106/31.78; 438/70; 347/106, 108; 524/81, 524/105
See application file for complete search history.

(56) References Cited

U.S. PATENT DOCUMENTS

| | | | |
|---|---|---|---|
| 6,013,415 A * | 1/2000 | Sakurai et al. | 430/281.1 |
| 6,100,312 A * | 8/2000 | Suzuki et al. | 522/6 |
| 6,312,771 B1 * | 11/2001 | Kashiwazaki et al. | 428/1.33 |
| 6,627,364 B2 | 9/2003 | Kiguchi et al. | |
| 6,641,961 B2 * | 11/2003 | Takebe | 430/7 |
| 7,710,517 B2 * | 5/2010 | Ito | 349/96 |
| 2004/0218115 A1 * | 11/2004 | Kawana et al. | 349/71 |

FOREIGN PATENT DOCUMENTS

| | | |
|---|---|---|
| CN | 1609638 A | 4/2005 |
| JP | 61-099102 A | 5/1986 |
| JP | 61-099103 A | 5/1986 |
| JP | 61-233704 A | 10/1986 |
| JP | 61-279802 A | 12/1986 |
| JP | 63-298304 A | 12/1988 |
| JP | 63-309916 A | 12/1988 |
| JP | 01-152449 A | 6/1989 |
| JP | 08-227012 A | 9/1996 |
| JP | 2000-310706 A | 11/2000 |
| JP | 2001-163951 A | 6/2001 |
| JP | 2002-201387 A | 7/2002 |
| JP | 2002-372615 A | 12/2002 |
| JP | 2004-339333 A | 12/2004 |
| JP | 2004-339358 A | 12/2004 |
| JP | 2004-339367 A | 12/2004 |
| JP | 2005-105114 A | 4/2005 |

OTHER PUBLICATIONS

Machine Translation of JP 2004-339367 A.*
Machine translation into English language of JP 2002-357712 A (Dec. 6, 2010).*
Chinese Office Action dated Jun. 18, 2010 on corresponding Chinese Application No. 2006-80046669.8.

* cited by examiner

Primary Examiner — David Wu
Assistant Examiner — Vu A Nguyen
(74) Attorney, Agent, or Firm — Sughrue Mion, PLLC

(57) ABSTRACT

The present invention provides an ink including at least a monomer and/or an oligomer and a coloring agent, wherein the coloring agent includes 16 to 56% by mass of a pigment C.I.P.R. 254 and 4 to 14% by mass of a pigment C.I.P.R. 177 based on the solid content of the ink, 14 to 49% by mass of a pigment C.I.P.G. 36 and 6 to 21% by mass of a pigment C.I.P.Y. 150 based on the solid content of the ink, or 19 to 51% by mass of a pigment C.I.P.B. 15:6 and 1.0 to 2.7% by mass of a pigment C.I.P.V. 23 based on the solid content of the ink. The invention also provides a color filter using the ink, a method for manufacturing the color filter, and a display device provided with the color filter.

16 Claims, No Drawings

INK, COLOR FILTER, AND METHOD FOR MANUFACTURING THE SAME, AND DISPLAY DEVICE

TECHNICAL FIELD

The present invention relates to a color filter which can be used preferably even in large-screen display devices such as notebook computers and TV monitors, a method for manufacturing the color filter, an ink used for the color filter and in the method for manufacturing the color filter, and a display device provided with the color filter.

BACKGROUND ART

A color filter for display devices has a structure wherein red, green and blue dotted images are arranged in matrix forms respectively on a substrate such as glass, and the borders therebetween are divided with deep-color separating walls such as black matrix. Examples of known methods for manufacturing such color filters wherein substrates such as glass are conventionally used as supports include 1) a staining method, 2) a printing method, 3) a colored photosensitive resin liquid method (colored resist method) that involves repeatedly performing application of a colored photosensitive resin liquid, exposure, and development (see, for example, Patent Documents 1 to 3), 4) a method that involves transferring images formed on a temporary support sequentially onto a final or temporary support (see, for example, Patent Documents 4 to 6), and 5) a method (transfer method) of forming a multicolor image for example by performing, repeatedly by the number of colors, application of a previously colored photosensitive resin liquid onto a temporary support thereby forming a colored layer thereon, and sequential and direct transfer of this photosensitive colored layer onto a substrate, followed by exposure and development (see, for example, Patent Document 7). Methods using ink-jet techniques (see Patent Documents 8 to 10) are also known.

Among these methods, the colored resist method can prepare a color filter with high positional accuracy, but cannot be said to be advantageous to costs because of high loss in the photosensitive layer resin liquid applied. On the other hand, the ink-jet method is advantageous to costs with low loss in the resin liquid, but suffers from inferior positional accuracy of pixels. In order to overcome these problems, a method for manufacturing a color filter by forming a black matrix by the colored resist method and forming R, G and B pixels by the ink-jet method is also proposed, but the resulting color filter is poor in color purity and still undergoes color mixing (satellite) due to the bending of the flight of ink droplets during printing, thus resulting in a deterioration in the qualities of the color filter.

In the ink-jet system, several to ten and several droplets of ink are discharged per pixel and evaporated to dryness thereby forming a pixel. However, when discharge of droplets in forming each pixel is unstable due to (1) failure to discharge droplets, (2) lateral direction discharge of droplets or (3) formation of small mist droplets (referred to hereinafter as "satellite mist"), uneven pixels may be formed. Particularly when (3) formation of satellite mist occurs, ink scatters on a black matrix around a pixel and on adjacent pixels, to cause deterioration in qualities of the color filter.

There is also proposed a method for manufacturing a color filter which comprises using an ink containing a pigment, a monofunctional monomer, a multifunctional monomer and an organic solvent, to form R, G, and B pixels, and subsequent curing with UV ray or electron beam (see, for example, Patent Documents 9 to 11). In a color filter prepared in this system, however, display unevenness (color unevenness) was observed due to color mixing (satellite) caused by bending of the flight of ink droplets during printing. The ink itself is poor in color reproduction, so the resulting flat panel remains poor in image quality.

Patent Document 1: Japanese Patent Application Laid-Open (JP-A) No. 63-298304
Patent Document 2: JP-A No. 63-309916
Patent Document 3: JP-A No. 1-152449
Patent Document 4: JP-A No. 61-99103
Patent Document 5: JP-A No. 61-233704
Patent Document 6: JP-A No. 61-279802
Patent Document 7: JP-A No. 61-99102
Patent Document 8: JP-A No. 8-227012
Patent Document 9: JP-A 2000-310706
Patent Document 10: JP-A 2002-201387
Patent Document 11: JP-A 2002-372615

DISCLOSURE OF INVENTION

Problems to be Solved by the Invention

An object of the present invention is to provide a color filter which has excellent chromaticity and can realize high color purity even when used particularly in large-screen display devices such as notebook computers and TV monitors, a method for manufacturing the color filter, an ink used preferably for the color filter and in the method for manufacturing the color filter, and a display device provided with the color filter.

Means for Solving Problems

In view of such circumstances, the inventors made extensive study for solving the problems, and as a result, they have found that when the respective pixels are formed by ink-jet using a combination of specific pigments as a coloring agent wherein the content of the pigments in the solid content is regulated, an excellent color filter can be obtained by preventing failure leading to defects such as bleeding and protruding of each color ink, and color mixing with adjacent pixels due to satellite, and the following inventions <1> to <7> have been thereby completed.

<1> An ink comprising at least (1) a monomer and/or an oligomer and (2) a coloring agent, wherein the coloring agent comprises a pigment C.I.P.R. 254 and a pigment C.I.P.R. 177, the content of the C.I.P.R. 254 is 16 to 56% by mass based on the solid content of the ink, and the content of the C.I.P.R. 177 is 4 to 14% by mass based on the solid content of the ink.

<2> An ink comprising at least (1) a monomer and/or an oligomer and (2) a coloring agent, wherein the coloring agent comprises a pigment C.I.P.G. 36 and a pigment C.I.P.Y. 150, the content of the C.I.P.G. 36 is 14 to 49% by mass based on the solid content of the ink, and the content of the C.I.P.Y. 150 is 6 to 21% by mass based on the solid content of the ink.

<3> An ink comprising at least (1) a monomer and/or an oligomer and (2) a coloring agent, wherein the coloring agent comprises a pigment C.I.P.B. 15:6 and a pigment C.I.P.V. 23, the content of the C.I.P.B. 15:6 is 19 to 51% by mass based on the solid content of the ink, and the content of the C.I.P.V. 23 is 1.0 to 2.7% by mass based on the solid content of the ink.

<4> The ink of any one of <1> to <3>, wherein the solid content of the ink is 50% by mass or more.

<5> A color filter comprising a red (R) pixel, a green (G) pixel and a blue (B) pixel, and deep-color separating walls for isolating the respective pixels from one another, wherein the ink of <1> or <4> is used for formation of the red (R) pixel, the ink of <2> or <4> is used for formation of the green (G) pixel, and the ink of <3> or <4> is used for formation of the blue (B) pixel.

<6> A method for manufacturing a color filter, the method comprising forming deep-color separating walls on a substrate and discharging red (R), green (G) and blue (B) inks by an ink-jet method onto concave portions enclosed by the deep-color separating walls to respectively form a red (R) pixel, a green (G) pixel and a blue (B) pixel on the concave portions, wherein the ink of <1> or <4> is used for formation of the red (R) pixel, the ink of <2> or <4> is used for formation of the green (G) pixel, and the ink of <3> or <4> is used for formation of the blue (B) pixel.

<7> A display device comprising the color filter of <5>.

Effect of Invention

The present invention can provide a color filter which has excellent chromaticity and can realize high color purity even when used particularly in large-screen display devices such as displays for notebook computers and TV monitors, a method for manufacturing the color filter, inks used preferably for the color filter and in the method for manufacturing the color filter, and a display device provided with the color filter.

BEST MODE FOR CARRYING OUT THE INVENTION

First, the ink of the invention will be described, and thereafter, a coating film of the ink of the present invention, a photosensitive resin transfer material, a color filter, a method for manufacturing the color filter, and a display device will be described.

<Ink>

The ink of the invention is an ink comprising at least (1) a monomer and/or an oligomer and (2) a coloring agent (hereinafter, referred to as "ink composition" or "colored liquid composition" in some cases). Now, the essential components, the above-mentioned (1) and (2), are described.

(1) Monomer and/or Oligomer

Examples of the monomer and/or oligomer (which is also referred to hereinafter as "polymerizable compound") that may be used in the invention include a radical-polymerizable compound which is cured by polymerization reaction with a radical active species, and a cationic-polymerizable compound which is cured by cationic polymerization reaction with a cation active species.

The ink of the invention may be constituted as a radical-polymerizable composition when the radical-polymerizable compound is used, or as a cationic-polymerizable composition when the cationic-polymerizable compound is used, and both constitutions are preferred.

-Radical-Polymerizable Compound-

Specifically, examples of the radical-polymerizable compound include, but are not limited to, the following compounds. Examples of the radical-polymerizable compound include monofunctional monomers and bi- or more functional monomers and oligomers.

The monofunctional monomer has one ethylenically unsaturated double bond, and examples thereof include butanediol monoacrylate, N,N-dimethylaminoethyl acrylate, 2-hydroxyethyl acrylate, 2-hydroxyethyl methacrylate, hydroxypropyl acrylate, 2-methoxyethyl acrylate, N-vinyl caprolactam, N-vinyl pyrrolidone, acryloyl morpholine, N-vinyl formamide, cyclohexyl acrylate, cyclohexyl methacrylate, dicyclopentanyl methacrylate, glycidyl acrylate, isobornyl acrylate, isodecyl acrylate, phenoxy methacrylate, stearyl acrylate, tetrahydrofurfuryl acrylate, 2-phenoxyethyl acrylate, 2-hydroxypropyl acrylate, 4-hydroxybutyl acrylate, isobutyl acrylate, t-butyl acrylate, isooctyl acrylate, isobornyl acrylate, methoxy triethylene glycol acrylate, 2-ethoxyethyl acrylate, tetrahydrofurfuryl acrylate, 3-methoxybutyl acrylate, benzyl acrylate, ethoxyethoxyethyl acrylate, butoxyethyl acrylate, ethoxy diethylene glycol acrylate, methoxy dipropylene glycol acrylate, methyl phenoxyethyl acrylate, dipropylene glycol acrylate etc.

Examples of the bi- or more functional monomer and oligomer include, for example, ethylene glycol di(meth)acrylate, diethylene glycol di(meth)acrylate, polyethylene glycol di(meth)acrylate, 1,6-hexanediol di(meth)acrylate, ethoxylated 1,6-hexanediol diacrylate, neopentylglycol di(meth)acrylate, ethoxylated neopentylglycol di(meth)acrylate, propoxylated neopentylglycol di(meth)acrylate, tripropyleneglycol di(meth)acrylate, polypropyleneglycol diacrylate, 1,4-butanediol di(meth)acrylate, 1,9-nonanediol diacrylate, tetraethyleneglycol diacrylate, 2-n-butyl-2-ethyl-1,3-propanediol diacrylate, dimethylol-tricyclodecane diacrylate, neopentylglycol hydroxypivalate diacrylate, 1,3-butyleneglycol di(meth)acrylate, ethoxylated bisphenol A di(meth)acrylate, propoxylated bisphenol A di(meth)acrylate, cyclohexanedimethanol di(meth)acrylate, dimethylol dicyclopentane diacrylate, trimethylol propane triacrylate, ethoxylated trimethylol propane triacrylate, propoxylated trimethylol propane triacrylate, pentaerythritol triacrylate, tetramethylol propane triacrylate, tetramethylol methane triacrylate, pentaerythritol tetraacrylate, caprolactone-modified trimethylol propane triacrylate, ethoxylated isocyanuric acid triacrylate, tri(2-hydroxyethyl isocyanurate) triacrylate, propoxylate glyceryl triacrylate, tetramethylol methane tetraacrylate, pentaerythritol tetraacrylate, ditrimethylol propane tetraacrylate, ethoxylated pentaerythritol tetraacrylate, dipentaerythritol hexaacrylate, neopentyl glycol oligoacrylate, 1,4-butanediol oligoacrylate, 1,6-hexanediol oligoacrylate, trimethylol propane oligoacrylate, pentaerythritol oligoacrylate, urethane acrylate, epoxy acrylate, polyester acrylate etc.

These compounds may be used singly or as a mixture of two or more thereof as necessary.

-Cationic-Polymerizable Compound-

The cationic-polymerizable compound is a compound that is cured by polymerization reaction caused by a cation active species generated from a photopolymerization initiator.

The cationic-polymerizable compounds include various known cationic-polymerizable monomers known as photocationic-polymerizable monomers, and examples include the vinyl ether compounds, oxetane compounds, oxirane compounds, epoxy compounds (aromatic epoxy resin, alicyclic epoxy resin, aliphatic epoxy resin) etc. described in, for example, JP-A No. 6-9714, JP-A No. 2001-31892, JP-A No. 2001-40068, JP-ANo. 2001-55507, JP-ANo. 2001-310938, JP-ANo. 2001-310937 and JP-ANo. 2001-220526, the disclosures of which are incorporated herein by reference.

Examples of the cationic-polymerizable compound having a vinyl ether as a functional group include, for example, urethane-type vinyl ether (vinyl ether urethane), ester-type vinyl ether etc. These oligomers may be used alone or as a mixture thereof.

Specific examples of the aromatic epoxy resin include a polyglycidyl ether of a polyvalent phenol having at least one aromatic ring or of its alkylene oxide adduct, for example, glycidyl ethers of bisphenol A or bisphenol F or of their alkylene oxide adducts, epoxy novolac resin, bisphenol A novolac diglycidyl ether, bisphenol F novolac diglycidyl ether, and the like.

Specific examples of the alicyclic epoxy resin include a polyglycidyl ether of polyvalent alcohol having at least one alicyclic ring, a cyclohexene oxide structure-containing compound or a cyclopentene oxide structure-containing compound that are obtained by epoxylating a cyclohexene ring-containing compound or a cyclopentene ring-containing compound with an oxidizing agent, and a vinylcyclohexane oxide structure-containing compound obtained by epoxylating a vinylcyclohexane structure-containing compound with an oxidizing agent. Examples include hydrogenated bisphenol A diglycidyl ether, 3,4-epoxycyclohexylmethyl-3,4-epoxycyclohexyl carboxylate, 3,4-epoxy-1-methylcyclohexyl-3,4-epoxy-1-methylcyclohexane carboxylate, 6-methyl-3,4-epoxycyclohexylmethyl-6-methyl-3,4-epoxycyclohexane carboxylate, 3,4-epoxy-3-methylcyclohexylmethyl-3,4-epoxy-3-methylcyclohexane carboxylate, 3,4-epoxy-5-methylcyclohexylmethyl-3,4-epoxy-5-methylcyclohexane carboxylate, 2-(3,4-epoxycyclohexyl-5,5-spiro-3,4-epoxy)cyclohexane-methadioxane, bis(3,4-epoxycyclohexylmethyl) adipate, vinylcyclohexane dioxide, 4-vinylepoxycyclohexane, bis(3,4-epoxy-6-methylcyclohexylmethyl) adipate, 3,4-epoxy-6-methylcyclohexyl carboxylate, methylene bis(3,4-epoxycyclohexane), dicyclopentadiene diepoxide, ethyleneglycol di(3,4-epoxycyclohexylmethyl)ether, ethylene bis(3,4-epoxycylohexane carboxylate), dioctyl epoxyhexahydrophthalate, di-2-ethylhexyl epoxyhexahydrophthalate, etc.

Specific examples of the aliphatic epoxy resin include a polyglycidyl ether of aliphatic polyhydric alcohol or of its alkylene oxide adduct, a polyglycidyl ester of aliphatic long-chain polybasic acid, an epoxy-containing compound obtained by oxidizing an aliphatic long-chain unsaturated hydrocarbon with an oxidizing agent, a homopolymer of glycidyl acrylate or glycidyl methacrylate, a copolymer of glycidyl acrylate or glycidyl methacrylate, etc. Typical compounds include polyhydric alcohol glycidyl ethers such as 1,4-butanediol diglycidyl ether, 1,6-hexanediol diglycidyl ether, glycerin triglycidyl ether, trimethylolpropane triglycidyl ether, pentaerythritol tetraglycidyl ether, sorbitol tetraglycidyl ether, dipentaerythritol hexaglycidyl ether, polyethyleneglycol diglycidyl ether, polypropyleneglycol diglycidyl ether, and polyether polyol polyglycidyl ethers obtained by adding one or more alkylene oxides to aliphatic polyhydric alcohols such as propylene glycol and glycerin, diglycidyl esters of aliphatic long-chain dibasic acid, etc. Further examples include aliphatic higher alcohol monoglycidyl ethers, phenols, cresols or butyl phenols, polyether alcohol monoglycidyl ethers obtained by adding alkylene oxide to the above compounds, higher fatty acid glycidyl esters, epoxylated soybean oil, octyl epoxystearate, butyl epoxystearate, epoxylated linseed oil, etc.

The amount of the polymerizable compound in the ink composition is preferably 50% by mass or more, more preferably 60% by mass or more, based on the total mass of the ink.

(2) Coloring Agent (i) In the first mode of the ink in the invention, that is, the R (red) ink contains C.I. pigment red (C.I.P.R.) 254 and C.I. pigment red (C.I.P.R.) 177.

(ii) In the second mode of the ink in the invention, that is, the G (green) ink contains C.I. pigment green (C.I.P.G.) 36 and C.I. pigment yellow (C.I.P.Y) 150.

(iii) In the third mode of the ink in the invention, that is, the B (blue) ink contains C.I. pigment blue (C.I.P.B.) 15:6 and C.I. pigment violet (C.I.P.V.) 23.

(i) In the first mode of the ink in the invention, the content of the C.I.P.R. 254 is 16 to 56% by mass based on the solid content of the ink, and the content of the C.I.P.R. 177 is 4 to 14% by mass based on the solid content of the ink.

In the first mode of the ink in the invention, the content of the C.I.P.R. 254 is preferably 20 to 40% by mass, more preferably 24 to 32% by mass, based on the solid content of the ink.

In the first mode of the ink in the invention, the content of the C.I.P.R. 177 is preferably 5 to 10% by mass, more preferably 6 to 8% by mass, based on the solid content of the ink.

(ii) In the second mode of the ink in the invention, the content of the C.I.P.G. 36 is 14 to 49% by mass based on the solid content of the ink, and the content of the C.I.P.Y. 150 is 6 to 21% by mass based on the solid content of the ink.

In the second mode of the ink in the invention, the content of the C.I.P.G 36 is preferably 16 to 42% by mass, more preferably 21 to 35% by mass, based on the solid content of the ink.

In the second mode of the ink in the invention, the content of the C.I.P.Y. 150 is preferably 7 to 18% by mass, more preferably 9 to 15% by mass, based on the solid content of the ink.

(iii) In the third mode of the ink in the invention, the content of the C.I.P.B. 15:6 is 19 to 51% by mass based on the solid content of the ink, and the content of the C.I.P.V. 23 is 1.0 to 2.7% by mass based on the solid content of the ink.

In the third mode of the ink in the invention, the content of the C.I.P.B. 15:6 is preferably 23 to 43% by mass, more preferably 25 to 38% by mass, based on the solid content of the ink.

In the third mode of the ink in the invention, the content of the C.I.P.V. 23 is preferably 1.2 to 2.3% by mass, more preferably 1.3 to 2.0% by mass, based on the solid content of the ink.

The solid content in the invention means the mass of components other than the solvent. Examples of the solvent include solvents described in "Shinpan Yozai Pocket Book" (edited by the Society of Synthetic Organic Chemistry, Japan, and published by Ohmsha, Ltd.) and "Yozai Handbook (Solvent Handbook)" edited by Shozo Asahara et al. and published by Kodansha Ltd. (1976). The solvent used in the invention will be described later.

As described above, the ink of the invention contains a specified amount of the specified pigment, thereby making it excellent in chromaticity. The ink of the invention, even when used in large screen display devices such as displays for notebook computers or TV monitors, can realize high color purity.

The pigments are used preferably as a dispersion liquid. This dispersion liquid may be prepared by adding a composition previously obtained by mixing the pigments with a pigment dispersant, to a solvent (or a vehicle) described later, and then dispersing them. The vehicle refers to a medium in a liquid state coating composition, disperses the pigments therein, is in a liquid state, and includes both a component (binder) that binds to the pigments to solidify a coating film and a component (organic solvent) that dissolves and dilutes it. A dispersing machine used in dispersing the pigments is not particularly limited and examples thereof include known dispersing machines such as a kneader, a roll mill, an atrighter, a super mill, a dissolver, a homomixer and a sand mill.

The coloring agent (pigment) used in the invention preferably has a particle diameter of 0.1 μm or less, particularly preferably a particle diameter of 0.08 μm or less.

In addition to the above-mentioned pigments, known coloring agents may be further added as necessary to the ink of the invention in such a range that the effect of the invention is not hindered. A pigment when used as the known coloring agent is desirably uniformly dispersed in the ink; for this purpose, the particle diameter of the pigment is preferably 0.1 μm or less, particularly preferably 0.08 μm or less.

Specifically, examples of the known coloring agent that can be preferably used in the invention include color materials described in paragraphs [0038] to [0040] in JP-A No. 2005-17716, the disclosure of which is incorporated herein by reference, pigments described in paragraphs [0068] to [0072] in JP-A No. 2005-361447, the disclosure of which is incorporated herein by reference, and coloring agents described in paragraphs [0080] to [0033] in JP-A 2005-17521, the disclosure of which is incorporated herein by reference.

(Other Additives)

Besides the additives described above, a binder, an initiator, a solvent, a heat polymerization inhibitor, a UV absorber, a complementary-color pigment, the "adhesion assistant" described in JP-A No. 11-133600, the disclosure of which is incorporated herein by reference, and other additives may be contained in the ink of the invention.

-Binder-

The binder used in the invention is not particularly limited and can be selected suitably depending on the object. The binder is preferably a polymer having a polar group such as a carboxylic acid group or a carboxylic acid base as the side chain. Examples of such polymers include the methacrylic acid copolymers, acrylic acid copolymers, itaconic acid copolymers, crotonic acid copolymers, maleic acid copolymers, and partially esterified maleic acid copolymers described in JP-A No. 59-44615, Japanese Patent Application Publication (JP-B) No. 54-34327, JP-B No. 58-12577, JP-B No. 54-25957, JP-ANo 59-53836, and JP-A No. 59-71048, the disclosures of which are incorporated herein by reference. Further examples include cellulose derivatives having carboxylic acid groups as their side chains. Besides, those prepared by adding a cyclic acid anhydride to a polymer having a hydroxyl group may be preferably used.

Particularly preferable examples include the copolymers of benzyl(meth)acrylate and (meth)acrylic acid, and the multicomponent copolymers of benzyl(meth)acrylate, (meth)acrylic acid and other monomers, as described in U.S. Pat. No. 4,139,391, the disclosure of which is incorporated herein by reference. These binder polymers having polar groups may be used singly or as a composition in combination with a usual film-making polymer, and the content thereof in the whole solid content of the ink is generally 20 to 50% by mass, preferably 25 to 45% by mass.

(Polymerization Initiator)

As the polymerization initiator used in the invention, a radical polymerization initiator which upon irradiation with an active energy ray, generates a radical active species to initiate polymerization of the radical-polymerizable compound, and a cationic polymerization initiator which generates a cationic active species to initiate polymerization of the cationic-polymerizable compound, can be used depending on the polymerizable compound.

-Radical Polymerization Initiator-

Examples of the radical polymerization initiator include, for example, benzophenone radical polymerization initiators such as benzophenone, benzoylbenzoic acid, 4-phenylbenzophenone, 4,4-diethylaminobenzophenone, 3,3'-dimethyl-4-methoxybenzophenone and 4-benzoyl-4'-methyldiphenylsulfide, thioxanthone radical polymerization initiators such as thioxanthone, 2-chloroxanthone, 2,4-diethylthioxanthone, 1-chloro-4-propoxythioxanthone and isopropylxanthone, acetophenone radical polymerization initiators such as 2-methyl-1-(4-methylthio) phenyl-2-morpholinopropan-1-one, 2-benzyl-2-dimethylamino-1-(4-morpholinophenyl)-butanone-1,2-hydroxy-2-methyl-1-pheny lpropan-1-one, 1-hydroxycyclohexyl phenyl ketone, 2,2-dimethyl-2-hydroxyacetophenone, 2,2-dimethoxy-2-phenylacetophenone, 4-phenoxydichloroacetophenone, diethoxyacetophenone and 1-hydroxycyclohexylphenylketone, benzoin radical polymerization initiators such as benzoin methyl ether, benzoin isobutyl ether and benzyl methyl ketal, and acyl phosphine oxide radical polymerization initiators such as 2,4,6-trimethyl benzoyl diphenyl phosphine oxide and bis(2,4,6-trimethylbenzoyl) acryl phosphine oxide.

Preferable examples of the cationic polymerization initiator includes, for example, diazonium salts, iodonium salts, sulfonium salts, iron-arene complexes and organic polyhalogen compounds. Examples of the diazonium salts, iodonium salts and sulfonium salts include compounds described in JP-B No. 54-14277, JP-B No. 54-14278, JP-A No. 51-56885, and U.S. Pat. Nos. 3,708,296 and 3,853,002, the disclosures of which are incorporated herein by reference.

Examples of the photocationic polymerization initiator include, for example, aromatic diazonium salts, aromatic sulfonium salts, aromatic iodonium salts, metallocene compounds, silicone compound/aluminum complexes, etc.

The ink of the invention may contain a solvent in addition to the components described above. When a solvent is contained, the ink can be endowed with fluidity suitable for jetting by an ink-jet method and can be used effectively in flatness formation. The amount of the solvent can be suitably selected in such a range that the effect of the invention is not hindered.

The solvent in the invention is to facilitate dissolution or dispersion of functional materials such as coloring agents, polymerizable monomers, additives and polymers contained in the ink of the invention, and functions in increasing the fluidity of the ink of the invention to facilitate jetting, and after the ink of the invention is jetted and subjected to drying and heat treatment, the majority (approximately 90% or more) of the solvent can be removed by evaporation etc. For example, the polymerizable monomers are also liquid but can have further improved fluidity by adding the solvent, thereby forming them easily into droplets. Usually, an organic solvent having a boiling point of 100° C. or less is used. For the purpose of preventing clogging in a head by preventing the ink from being dried, a high-boiling point solvent having a boiling point of 200° C. or less or of higher than 200° C. depending on the case may be used.

As previously described, examples of the solvent in the invention include solvents described in "Shinpan Yozai Pocket Book" edited by the Society of Synthetic Organic Chemistry, Japan, and published by Ohmsha, Ltd.) and "Yozai Handbook (Solvent Handbook)" edited by Shozo Asahara et al. and published by Kodansha Ltd. (1976).

Specific examples of the solvent that may be used in the invention include high-boiling point solvents such as, for example, deionized water, ethylene glycol monoalkyl ether acetates such as ethylene glycol monomethyl ether acetate; diethylene glycol monoalkyl ethers such as diethylene glycol monomethyl ether and diethylene glycol monoethyl ether; diethylene glycol monoalkyl ether acetates such as diethylene glycol mono-n-butyl ether acetate; propylene glycol monoalkyl ether acetates such as propylene glycol monomethyl ether acetate and propylene glycol monoethyl ether acetate; other ethers such as diethylene glycol dimethyl ether; ketones such as cyclohexanone, 2-heptanone, 3-heptanone, methyl ethyl ketone, methyl isobutyl ketone and acetone; alkyl lactates such as ethyl 2-hydroxypropionate; esters such as 3-methyl-3-methoxybutyl propionate, ethyl 3-methoxypropionate, methyl 3-ethoxypropionate, ethyl 3-ethoxypropionate, n-butyl acetate, isobutyl acetate, n-amyl formate, isoamyl acetate, n-butyl propionate, ethyl butyrate, isopropyl butyrate, n-butyl butyrate and ethyl pyruvate; and γ-butyrolactone.

The solid content of the ink of the invention is preferably 20% by mass or more, more preferably 50% by mass or more.

By regulating the solid content of the ink in the range of 20% by mass or more as described above, a color filter that can, when mounted on a TV or a monitor, attain a wide color reproduction range and a high contrast ratio without display unevenness can be produced highly efficiently at low costs by using the ink.

-Heat Polymerization Inhibitor-

The ink of the invention preferably contains a heat polymerization initiator. Examples of the heat polymerization inhibitor include hydroquinone, hydroquinone monomethyl ether, p-methoxyphenol, di-t-butyl-p-cresol, pyrogallol, t-butylcatechol, benzoquinone, 4,4'-thiobis(3-methyl-6-t-butylphenol), 2,2'-methylenebis(4-methyl-6-t-butylphenol), 2-mercaptobenzimidazole, phenothiazine etc.

-UV Absorber-

If necessary, the ink of the invention may contain an UV absorber. Examples of the UV absorber include not only compounds described in JP-A No. 5-72724, the disclosure of which is incorporated herein by reference, but also salicylate compounds, benzophenone compounds, benzotriazole compounds, cyanoacrylate compounds, nickel chelate compounds and hindered amine compounds.

Specific examples include phenyl salicylate, 4-t-butylphenyl salicylate, 2,4-di-t-butylphenyl-3',5'-di-t-4'-hydroxy benzoate, 4-t-butylphenyl salicylate, 2,4-dihydroxybenzophenone, 2-hydroxy-4-methoxybenzophenone, 2-hydroxy-4-n-octoxybenzophenone, 2-(2'-hydroxy-5'-methylphenyl)benzotriazole, 2-(2'-hydroxy-3'-t-butyl-5'-methylphenyl)-5-chlorobenzotriazole, ethyl-2-cyano-3,3-diphenyl acrylate, 2,2'-hydroxy-4-methoxybenzophenone, nickel dibutyl dithiocarbamate, bis(2,2,6,6-tetramethyl-4-pyridine)-sebacate, 4-t-butylphenyl salicylate, phenyl salicylate, a 4-hydroxy-2,2,6,6-tetramethyl piperidine condensate, succinic acid-bis(2,2,6,6-tetramethyl-4-piperidenyl)-ester, 2-[2-hydroxy-3,5-bis(α,α-dimethylbenzyl) phenyl]-2H-benzotriazole, 7-{[4-chloro-6-(diethylamino)-5-triazin-2-yl]amino}-3-phenyl coumarin, etc.

A coating film such as a colored layer formed by using the ink of the invention is formed preferably by the ink-jet system using the above-described ink of the invention.

<Color Filter and Method for Manufacturing the Same>

The color filter of the invention has, on a substrate, a red (R) pixel, a green (G) pixel and a blue (B) pixel, and deep-color separating walls for isolating the respective pixels from one another, and is obtained by discharging the ink by the ink-jet method onto concave portions enclosed by the deep-color separating walls, thereby arranging colored regions (colored layer) to form a pixel pattern, wherein the above-mentioned first mode of the ink in the invention is used as an ink for forming the red (R) pixel, the above-mentioned second mode of the ink in the invention is used as an ink for forming the green (G) pixel, and the above-mentioned third mode of the ink in the invention is used as an ink for forming the blue (B) pixel.

The method for manufacturing a color filter according to the invention comprises a step of forming deep-color separating walls on a substrate, and a step of discharging inks by the ink-jet method onto concave portions enclosed by the deep-color separating walls, thereby forming a red (R) pixel, a green (G) pixel and a blue (B) pixel on the concave portions (hereinafter referred to sometimes as "colored region-forming step"), wherein the above-mentioned first mode of the ink in the invention is used as an ink for forming the red (R) pixel, the above-mentioned second mode of the ink in the invention is used as an ink for forming the green (G) pixel, and the above-mentioned third mode of the ink in the invention is used as an ink for forming the blue (B) pixel. Preferably, the method of the invention may further comprise a curing step of curing the formed colored region of at least one color by irradiation with an active ray or a curing step of curing with heat after formation of all colored regions of desired hues, and if necessary other steps such as a baking step and an ink repellent treatment step.

The deep-color separating walls are formed on a substrate before a step of forming colored regions, and the step of forming deep-color separating walls will be described in detail later.

-Step of Forming a Colored Region-

The step of forming a colored region involves applying the above-mentioned ink (R, G, or B) of the invention by the ink-jet method onto a concave portion between deep-color separating walls to form a colored region. This colored region becomes a color pixel such as red (R), green (G) or blue (B) contained in the color filter.

The colored regions may be formed by injecting the inks of the invention as colored liquid compositions for forming colored pixels (for example a pixel pattern of 3 colors R, G and B) in concave portions enclosed by deep-color separating walls formed on a substrate as described above, so as to contain at least red (R), green (G) and blue (B) pixels.

In this step, the amount of the ink discharged onto the concave portion enclosed by deep-color separating walls is preferably suitably selected to attain a desired hue and density.

The shape of the color filter pattern is not particularly limited and may be the general shape of a black matrix such as strip shape, lattice shape or delta alignment.

The ink-jet method can use known methods such as a method of heat-curing the ink, a method of photo-curing the ink, or a method of jetting droplets onto a transparent image-receiving layer previously formed on a substrate.

Examples of the ink-jet method that may be used in the invention include various methods such as a method of continuously discharging a charged ink under the control of an electric field, a method of discharging an ink intermittently with a piezoelectric element, a method of heating an ink and discharging it intermittently by utilizing foaming of the ink upon heating.

From the viewpoint of discharge stability, it is preferable that the ink is discharged while the ink viscosity is reduced by heating at 40 to 70° C. Generally, the colored liquid composition is more viscous than the aqueous ink and thus shows fluctuation in viscosity in a broader range upon fluctuation in temperature. The fluctuation in viscosity directly exerts significant influence on the size of droplets and the rate of discharge of droplets, thus easily deteriorating image qualities, so it is important to maintain the temperature of the ink as constant as possible.

As an ink-jet head (also referred hereinafter to simply as head), a known head may be applied, and heads of continuous type or dot-on-demand type may be used. Among the heads of dot-on-demand type, thermal heads having an operating valve described in JP-A No. 9-323420, the disclosure of which is incorporated herein by reference, are preferable for discharging. As piezo heads, those heads described in, for example, European Patent Application publication Nos. 277, 703A and 278,590A, the disclosures of which are incorporated herein by reference, may be used. The heads are preferably those having such a temperature-regulating function as to be able to control the temperature of the ink. Preferably, the discharging temperature is established such that the viscosity of the ink is reduced to 5 to 25 mPa·s, and the ink temperature is regulated such that the range of fluctuation in viscosity is kept within ±5%. The head is operated preferably with a drive frequency of 1 to 500 kHz.

-Curing Step-

Now, the steps that may be provided other than the colored region-forming step are described in detail.

<<First Curing Step>>

The method of the invention may comprise a step of curing a colored region of at least one color formed in the colored region-forming step, by irradiating the colored region with an active ray (first curing step). In the first curing step, the curable inks of the respective colors including red (R), green (G) and blue (B) can be cured to form cured colored regions. Curing may be carried out each time a colored region of one color is formed, or may be carried out after colored regions of plural colors are formed.

Curing of the R, G and B inks of the invention may be carried out by exposure to a light from an energy source for emitting an active energy ray in a wavelength region corresponding to the photosensitive wavelength of each ink thereby accelerating the polymerization.

The energy source may be suitably selected from, for example, those emitting a UV ray at 400 to 200 nm, far-UV ray, g-line, h-line, i-line, KrF excimer laser light, ArF excimer laser light, electron beam, X-ray, molecular beam and ion beam with which the above-mentioned polymerization initiator can be sensitized. Specifically, a light source for emitting an active ray in the wavelength range of 250 to 450 nm, preferably 365±20 nm, for example, LD, LED (light emitting diode), a fluorescent lamp, a low-pressure mercury lamp, a high-pressure mercury lamp, a metal halide lamp, a carbon arc lamp, a xenon lamp, a chemical lamp or the like may be preferably used in curing. Preferable light sources include LED, a high-pressure mercury lamp, a metal halide lamp, and the like.

The time of irradiation with an active energy ray may be suitably established depending on a combination of the polymerizable compound and the polymerization initiator and may be for example 1 to 750 seconds in the case of exposure to a light with an illumination intensity of 20 mW/cm$^2$.

<<Second Curing Step>>

The method for manufacturing a color filter according to the invention may further comprise a step of curing all colored regions of desired hues including red (R), green (G) and blue (B) by heating (second curing step). As described above, both the production efficiency and display properties of the color filter can be satisfied by providing the method with both the first and second curing steps.

This step is carried out after colored regions consisting of desired hues and deep-color separating walls have been formed and subjected to the first curing step. In this step, curing with heat is achieved by heat treatment (baking). That is, a substrate on which the colored regions photo-polymerized with light irradiation and the deep-color separating walls have been formed is heated by placing it in an electric oven, a drying oven or the like, or by irradiation with an infrared lamp.

Although the heating temperature and heating time in this step depend on the colored liquid composition and the thickness of the colored region, heating is carried out generally preferably at about 120° C. to about 250° C. for about 10 minutes to about 120 minutes, from the viewpoint of securing sufficient solvent resistance, alkali resistance, and UV absorbance.

The size of the colored region (colored layer) formed by the method for manufacturing a color filter according to the invention is preferably 50 to 300 μm, more preferably 70 to 300 μm, more preferably 100 to 300 μm.

The surface roughness (Ra value) of the colored region (colored layer) formed by applying the ink of the invention by ink-jetting is preferably 5 nm or less, more preferably 4 nm or less. This Ra value is measured by a contact-type film thickness meter (probe-type surface roughness meter P10 manufactured by Tencor).

-Step of Forming Deep-Color Separating Walls-

A step of forming deep-color separating walls is conducted prior to the colored region-forming step and the curing step described above. This step of forming deep-color separating walls uses a deep-color composition to form deep-color separating walls.

In the invention, the deep-color composition is preferably a composition of high optical density. The deep-color composition has such optical density as to have an optical density of preferably 2.0 to 10.0, more preferably 2.5 to 6.0, still more preferably 3.0 to 5.0, upon formation of deep-color separating walls.

When the deep-color composition and a photosensitive resin layer described later are cured by the photoinitiation system as described later, the optical density thereof toward the wavelength of exposure light (generally in the UV range) is also important. The optical density in this case is preferably 2.0 to 10.0, more preferably 2.5 to 6.0, still more preferably 3.0 to 5.0. With this defined range given, polymerization curing is made excellent to achieve formation of deep-color separating walls of desired shape. The property of deep color can be given by using various color materials such as dyes and pigments described later or by using carbon in various forms or materials consisting of combinations thereof, and black is most common.

The deep-color composition may contain at least a color material, a polymerization initiation system and a polymerizable compound, wherein the polymerization initiation system generally may be a thermal initiation system using a thermal initiator or a photoinitiation system using a photoinitiator, among which the photoinitiation system is preferable.

In the case of the photoinitiation system, formation of the deep-color separating walls in the color filter in the invention can be preferably carried out for example before the colored region-forming step and the curing step described above, by using the deep-color composition to form a photosensitive resin layer on at least one side of a substrate and then exposing the formed photosensitive resin layer to a light in patterns (preferably under a dysoxic condition) followed by development. As described above, the deep-color separating walls are a deep-color separating wall pattern for isolating the colored regions formed from ink-jet droplets of the ink (colored liquid composition) of the invention by the ink-jet method. At least after the photosensitive resin layer is formed and exposed to light in the step of forming deep-color separating walls, other steps such as a baking step and an ink repellent treatment step may be carried out as necessary.

Hereinafter, the invention is described in detail mainly by reference to a photoinitiation system used as the polymerization initiation system.

[Formation of Photosensitive Resin Layer]

The photosensitive resin layer may be formed by using a deep-color composition containing a color material, a polymerizable compound and a photoinitiation system, and if necessary, a binder, known additives, for example, a plasticizer, a filler, a stabilizer, a polymerization inhibitor, a surfactant, a solvent, an adhesion promoter and the like.

Specifically, the photosensitive resin layer may be formed by a method of applying the deep-color composition (for example, the composition containing at least a polymerizable monomer, a photopolymerization initiator, a binder and a color material) onto a substrate (preferably a coating method that involves coating with the deep-color composition), or by a method of using a photosensitive transfer material having a photosensitive resin layer formed from the deep-color composition to transfer the photosensitive resin layer onto a substrate (transfer method). The deep-color composition and the photosensitive transfer material will be described later in more detail.

When the method of forming the photosensitive resin layer by coating (coating method) is used, coating is carried out preferably with a slit-shaped nozzle or slit coater having a slit-shaped pore in a portion thorough which a liquid is discharged.

Specific examples of the slit-shaped nozzle and slit coater that can be preferably used in the invention are those described in JP-A No. 2004-89851, JP-A No. 2004-17043, JP-A 2003-170098, JP-A 2003-164787, JP-A 2003-10767, JP-A No. 2002-79163, JP-A 2001-310147, the disclosures of which are incorporated herein by reference. As other examples, coating machines such as a spinner, a whirler, a roller coater, a curtain coater, a knife coater, a wire bar coater and an extruder may be used.

When the coating method is used, the deep-color separating wall may be formed by coating a substrate with the deep-color composition to form a photosensitive resin layer on the substrate, then exposing the photosensitive resin layer thus formed by coating, to a light (preferably under a dysoxic condition [for example, via an oxygen-shielding layer further formed by coating on the photosensitive resin layer, or in an inert gas atmosphere or under a reduced condition]) following by development and patterning. The oxygen-shielding layer may be constituted in the same manner as an oxygen-shielding layer of a photosensitive transfer material described later. Exposure and development will be described later in more detail.

When the transfer method is used, a photosensitive transfer material described later, having a photosensitive resin layer formed in the form of a film on a temporary support, is stuck (laminated) on the surface of a substrate by pressure-bonding or thermally pressure-bonding by means of a roller or a flat plate, and then the photosensitive resin layer (under a dysoxic condition) with the temporary support remaining thereon, or the photosensitive resin layer from which the temporary support was released, is transferred onto the substrate, and the photosensitive resin layer thus formed by transferring onto the substrate is exposed to a light (preferably under a dysoxic condition [for example, via an oxygen-shielding layer arranged on the photosensitive resin layer]) followed by development and patterning thereby forming the deep-color separating walls. Exposure and development will be described later in more detail.

The lamination may be carried out specifically with laminators and lamination methods described in JP-A No. 7-110575, JP-A No. 11-77942, JP-A No. 2000-334836 and JP-A No. 2002-148794, the disclosures of which are incorporated herein by reference. The photosensitive transfer material and transfer by the transfer method will be described later in more detail.

The thickness of the photosensitive resin layer is not particularly limited, and depends on the solid content of the deep-color composition and the height of the deep-color separating wall formed. Generally, the thickness is preferably 1.5 to 10 μm, more preferably 1.8 to 7.0 μm, still more preferably 2.2 to 5.0 μm.

-Deep-Color Composition, Photosensitive Resin Layer-

Hereinafter, the deep-color composition for forming deep-color separating walls, and constituents of a photosensitive resin layer formed using the composition, are described in detail.

-Polymerizable Compound-

The photosensitive resin layer or the deep-color composition for forming deep-color separating walls preferably contains at least one kind of polymerizable component. This polymerizable component can be cured by the action of an active species from a photoinitiation system described later, to form a pattern.

Examples of the polymerizable compound used in the photosensitive resin layer or in the deep-color composition include monofunctional or multifunctional monomers, among which multifunctional monomers are preferable. The multifunctional monomer is a polymerizable monomer having two or more polymerizable groups and may be used singly or in combination with other monomers.

Specific examples of the monofunctional or multifunctional monomers include t-butyl (meth)acrylate, ethyleneglycol di(meth)acrylate, 2-hydroxypropyl (meth)acrylate, triethyleneglycol di(meth)acrylate, trimethylolpropane tri(meth)acrylate, 2-ethyl-2-butyl-propanediol di(meth)acrylate, pentaerythritol tri(meth)acrylate, pentaerythritol tetra(meth)acrylate, dipentaerythritol hexa(meth)acrylate, dipentaerythritol penta(meth)acrylate, polyoxyethylated trimethylolpropane tri(meth)acrylate, tris(2-(meth)acryloyloxyethyl) isocyanurate, 1,4-diisopropenyl benzene, 1,4-dihydroxybenzene di(meth)acrylate, decamethyleneglycol di(meth)acrylate, styrene, diallyl fumarate, triallyl trimellitate, lauryl (meth)acrylate, (meth)acrylamide, xylylene bis(meth)acrylamide, etc.

Further examples include reaction products between a hydroxyl-containing compound such as 2-hydroxyethyl (meth)acrylate, 2-hydroxypropyl (meth)acrylate or polyethyleneglycol mono(meth)acrylate etc. and a diisocyanate such as hexamethylene diisocyanate, toluene diisocyanate or xylene diisocyanate.

Particularly preferable among those mentioned above are pentaerythritol tetraacrylate, dipentaerythritol hexaacrylate, dipentaerythritol pentaacrylate, and tris(2-acryloyloxyethyl) isocyanurate.

The content of the polymerizable compound in the photosensitive resin layer or in the deep-color composition is preferably 5 to 80% by mass, more preferably 10 to 70% by mass, based on the total solid content (mass) of the layer or composition. When the content is within the range defined above, resistance to an alkali developing solution after photo-curing can be effectively secured.

-Photoinitiation System-

The photosensitive resin layer or the deep-color composition for forming deep-color separating walls preferably contains at least one type of photoinitiation systems. The photoinitiation system refers to a compound which upon irradiation (also called exposure) of radiations such as visible ray, UV ray, far-ultraviolet ray, electron beam and X-ray, generates an active species for initiating polymerization of the polymerizable compound, and may be selected suitably from the compounds known in the art.

Examples of such compounds can include trihalomethyl group-containing compounds, acridine compounds, acetophenone compounds, bisimidazole compounds, triazine compounds, benzoin compounds, benzophenone compounds, α-diketone compounds, multinuclear quinone compounds, xanthone compounds, diazo compounds and the like.

Specific examples include trihalomethyl group-containing compounds such as trihalomethyloxazole derivatives substituted with a trihalomethyl group and s-triazine derivatives described in JP-A No. 2001-117230, the disclosure of which is incorporated herein by reference, trihalomethyl-s-triazine compounds described in U.S. Pat. No. 4,239,850, the disclosure of which is incorporated herein by reference, and trihalomethyloxadiazole compounds described in U.S. Pat. No. 4,212,976, the disclosure of which is incorporated herein by reference; acridine compounds, for example bis(9-acridinyl) alkanes such as 9-phenyl acridine, 9-pyridyl acridine, 9-pyrazinyl acridine, 1,2-bis(9-acridinyl)ethane, 1,3-bis(9-acridinyl) propane, 1,4-bis(9-acridinyl) butane, 1,5-bis(9-acridinyl) pentane, 1,6-bis(9-acridinyl) hexane, 1,7-bis(9-acridinyl) heptane, 1,8-bis(9-acridinyl) octane, 1,9-bis(9-acridinyl) nonane, 1,10-bis(9-acridinyl) decane, 1,11-bis(9-acridinyl) undecane, and 1,12-bis(9-acridinyl) dodecane;

triazine compounds such as 6-(p-methoxyphenyl)-2,4-bis (trichloromethyl)-s-triazine and 6-[p-(N,N-bis(ethoxycarbonylmethyl) amino) phenyl]-2,4-bis(trichloromethyl)-s-triazine; 9,10-dimethylbenzophenazine, Michler's ketone, benzophenone/Michler's ketone, hexaaryl bisimidazole/mercaptobenzimidazole, benzylmethylketal, thioxanthone/amine, and 2,2'-bis(2,4-dichlorophenyl)-4,4',5,5'-tetraphenyl-1,2'-bisimidazole.

Among the compounds described above, at least one member selected from the trihalomethyl group-containing compounds, acridine compounds, acetophenone compounds, bisimidazole compounds and triazine compounds is preferable, and at least one member selected from the trihalomethyl group-containing compounds and acridine compounds is particularly preferable. The trihalomethyl group-containing compounds and acridine compounds are also useful in that they are inexpensive and widely used.

Particularly preferable compounds include 2-trichloromethyl-5-(p-styrylstyryl)-1,3,4-oxadiazole and 2-(p-butoxystyryl)-5-trichloromethyl-1,3,4-oxadiazole as the trihalomethyl group-containing compound, 9-phenyl acridine as the acridine compound, 6-[p-(N,N-bis(ethoxycarbonylmethyl) amino) phenyl]-2,4-bis(trichloromethyl)-s-triazine as the triazine compound, Michler's ketone as the benzophenone compound and 2,2'-bis(2,4-dichlorophenyl)-4,4',5,5'-tetraphenyl-1,2'-bisimidazole as the biimizazole compound.

The polymerization initiation systems (particularly the photoinitiation systems) may be used singly or in combination of two or more thereof.

The total amount of the polymerization initiation systems (particularly the photoinitiation systems) in the photosensitive resin layer or in the deep-color composition is preferably 0.1 to 20% by mass, more preferably 0.5 to 10% by mass, based on the total solid content (mass) of the layer or composition. When the total amount is in this range, the efficiency of curing is so high that curing can be achieved in a short time, and image patterns formed by development will not fall off, or the surface of the patterns will not be roughened.

The photoinitiation system may be constituted in combination with a hydrogen donor. From the viewpoint of further improving sensitivity, the hydrogen donor is preferably a mercaptan compound, an amine compound or the like defined below. As used herein, the "hydrogen donor" refers to a compound capable of donating a hydrogen atom to a radical generated from the photopolymerization initiator upon exposure.

The mercaptan compound is a compound having a benzene ring or a heterocycle as a core to which 1 or more, preferably 1 to 3, more preferably 1 to 2 mercapto groups are directly bound (hereinafter referred to as "mercaptan hydrogen donor").

The amine compound is a compound having a benzene ring or a heterocycle as a core to which 1 or more, preferably 1 to 3, more preferably 1 to 2 amino groups are directly bound (hereinafter referred to as "amine hydrogen donor").

The hydrogen donor may have both a mercapto group and an amino group.

Specific examples of the mercaptan hydrogen donor include 2-mercaptobenzothiazole, 2-mercaptobenzoxazole, 2-mercaptobenzimidazole, 2,5-dimercapto-1,3,4-thiadiazole, 2-mercapto-2,5-dimethylaminopyridine, etc. Among these compounds, 2-mercaptobenzothiazole and 2-mercaptobenzoxazole are preferable, and 2-mercaptobenzothiazole is particularly preferable.

Specific examples of the amine hydrogen donor include 4,4'-bis(dimethylamino) benzophenone, 4,4'-bis(diethylamino) benzophenone, 4-diethylaminoacetophenone, 4-dimethylaminopropiophenone, ethyl 4-dimethylaminobenzoate, 4-dimethylaminobenzoic acid, 4-dimethylaminobenzonitrile etc. Among these compounds, 4,4'-bis(dimethylamino) benzophenone and 4,4'-bis(diethylamino) benzophenone are preferable, and particularly 4,4'-bis(diethylamino) benzophenone is preferable.

The hydrogen donors may be used singly or as a mixture of two or more thereof, and one or more mercaptan hydrogen donors and one or more amine hydrogen donors are preferably simultaneously used because formed images hardly fall off from a substrate during development, and intensity and sensitivity can be improved.

Specific examples of combinations of the mercaptan hydrogen donor and the amine hydrogen donor include 2-mercaptobenzothiazole/4,4'-bis(dimethylamino) benzophenone, 2-mercaptobenzothiazole/4,4'-bis(diethylamino) benzophenone, 2-mercaptobenzoxazole/4,4'-bis(dimethylamino) benzophenone, 2-mercaptobenzoxazole/4,4'-bis(diethylamino) benzophenone, etc. More preferable combinations include 2-mercaptobenzothiazole/4,4'-bis(dimethylamino) benzophenone and 2-mercaptobenzoxazole/4,4'-bis(diethylamino) benzophenone, and a particularly preferable combination is 2-mercaptobenzothiazole/4,4'-bis(diethylamino) benzophenone.

When the mercaptan hydrogen donor is combined with the amine hydrogen donor, the mass ratio of the mercaptan hydrogen donor (M):amine hydrogen donor (A) (that is, M:A) is usually preferably 1:1 to 1:4, more preferably 1:1 to 1:3.

The total amount of the hydrogen donors in the photosensitive resin layer or in the deep-color composition is preferably 0.1 to 20% by mass, more preferably 0.5 to 10% by mass, based on the total solid content (mass) of the layer or composition.

-Color Material-

The photosensitive resin layer or the deep-color composition for forming deep-color separating walls preferably contains at least one kind of color material. By incorporating a color material, a visible image having a desired color can be formed.

Examples of the color material that can be preferably used in the invention include pigments and dyes described in paragraphs [0038] to [0054] in JP-A No. 2005-17716, the disclosure of which is incorporated herein by reference, pigments described in paragraphs [0068] to [0072] in JP-A No. 2004-361447, the disclosure of which is incorporated herein by reference, and coloring agents described in paragraphs [0080] to [0088] in JP-A 2005-17521, the disclosure of which is incorporated herein by reference.

In particular, organic pigments, inorganic pigments, dyes etc. are preferable, and when a light blocking effect is required of the photosensitive resin layer or the deep-color composition, use can be made of light-shielding agents such as carbon black, titanium carbon, metal oxide powders of titanium oxide, iron tetroxide etc., metal sulfide powders and metal powders, as well as mixtures of pigments of red, blue and green colors. Known coloring agents (dyes and pigments) may be used. Preferable examples of black color materials include carbon black, titanium carbon, iron oxide, titanium oxide, graphite etc., among which carbon black is particularly preferable.

When a pigment is selected as the color material, it is preferably dispersed uniformly in the photosensitive resin layer or the deep-color composition.

From the viewpoint of reducing the development time, the content of the color material in the photosensitive resin layer or the deep-color composition is preferably 30 to 70% by mass, more preferably 40 to 60% by mass, still more preferably 50 to 55% by mass, based on the solid content (mass) of the layer or composition.

The pigment used in the photosensitive resin layer or in the deep-color composition is used desirably as a dispersion liquid. This dispersion liquid may be prepared by adding a composition previously obtained by mixing the pigments with a pigment dispersant, to an organic solvent (or a vehicle) described later and then dispersing them. The vehicle refers to a medium in a liquid state coating composition, disperses the pigments therein, is in a liquid state, and includes both a component (binder) that binds to the pigments to solidify a coating film and a component (organic solvent) that dissolves and dilutes it. Examples of a dispersing machine used in dispersing the pigments are not particularly limited and include known dispersing machines such as a kneader, a roll mill, an atrighter, a super mill, a dissolver, a homomixer and a sand mill described in "Ganryou no Jiten (Pigment Dictionary)" authored by Kunizo Asakura, first edition, p. 438 and published by Asakura Publishing Co., Ltd. (2000), the disclosure of which is incorporated herein by reference. The pigment may be finely pulverized by frictional force upon mechanical friction as described on page 310 in "Ganryo no Jiten".

The particle diameter of the color material (particularly the pigment), in terms of number-average particle diameter, is preferably 0.001 to 0.1 μm, more preferably 0.01 to 0.08 μm, from the viewpoint of dispersion stability. As used herein, "particle diameter" refers to the diameter of a circle which corresponds in area to the particle in an electron micrograph, and "number-average particle diameter" refers to the average value of the particle diameters of 100 particles.

-Binder-

The photosensitive resin layer or the deep-color composition for forming deep-color separating walls may contain at least one kind of binder. Examples of the binder include the same binders as contained in the ink composition described above.

The content of the binder in the photosensitive resin layer or the deep-color composition is preferably 20 to 50% by mass, more preferably 25 to 45% by mass, relative to the total solid content (mass) of the layer or the composition.

-Solvent-

The deep-color composition used in preparing deep-color separating walls in the invention can be composed generally of an organic solvent in addition to the components described above. Examples of the organic solvent include methyl ethyl ketone, propylene glycol monomethyl ether, propylene glycol monomethyl ether acetate, cyclohexanone, cyclohexanol, methyl isobutyl ketone, ethyl lactate, methyl lactate, caprolactam, and the like.

-Other Components-

The deep-color composition or the photosensitive resin layer in the invention may further contain components described below, for example, a surfactant, an UV absorber and known additives such as a plasticizer, a filler, a stabilizer, a heat polymerization inhibitor, a solvent and an adhesion promoter. The deep-color composition is preferably rendered soft or sticky, at least at a temperature of 150° C. or less, and is also preferably thermoplastic. From this point of view, the composition may be modified with a compatible plasticizer.

<Surfactant>

When the deep-color composition is applied onto a substrate or a temporary support for a photosensitive transfer material described later, a surfactant may be contained in the deep-color composition thereby enabling the thickness of the resulting film to be uniform and effectively preventing coating unevenness. Preferable examples of the surfactant include surfactants described in JP-A No. 2003-337424 and JP-A No. 11-133600, the disclosures of which are incorporated herein by reference. The content of the surfactant in the composition is generally 0.001 to 1% by mass, preferably 0.01 to 0.5% by mass, more preferably 0.03 to 0.3% by mass, based on the total solid content (mass) of the composition.

<UV Absorber>

The deep-color composition may also contain an UV absorber if necessary.

Examples of the UV absorber include the same UV absorbers as contained in the previously described ink composition.

When the UV absorber is to be used, the content of the UV absorber is generally 0.5 to 15% by mass, preferably 1 to 12% by mass, more preferably 1.2 to 10% by mass, based on the total solid content of the deep-color composition.

<Heat Polymerization Inhibitor>

The deep-color composition preferably contains a heat polymerization inhibitor. Examples of the heat polymerization inhibitor include the same heat polymerization inhibitors as contained in the ink composition described above.

When the heat polymerization inhibitor is to be used, the content of the heat polymerization inhibitor is generally 0.01 to 1% by mass, preferably 0.02 to 0.7% by mass, more preferably 0.05 to 0.5% by mass, based on the total solid content of the deep-color composition.

Besides the components described above, the "adhesion assistant" and other additives described in JP-A No. 11-133600, the disclosure of which is incorporated herein by reference, may also be contained in the deep-color composition.

-Photosensitive Transfer Material-

Now, the photosensitive transfer material used in the above-described transfer method is described in detail.

The photosensitive transfer material that is used in the invention may be a material wherein at least a photosensitive resin layer formed from the deep-color composition is arranged on a temporary support, preferably a material comprising an oxygen-shielding layer and the photosensitive resin layer formed in this order on a temporary support. When the material comprising an oxygen-shielding layer arranged on the photosensitive resin layer is used, the photosensitive resin layer consisting of the deep-color composition is protected against oxygen in the air by the oxygen-shielding layer and is thus automatically subject to a dysoxic condition. Accordingly, it is not necessary to conduct the exposure step in an inert gas or under reduced pressure, so there is an advantage that the existing step may be utilized as it is. There is also an advantage that the deep-color separating wall can be formed easily at low costs.

The photosensitive transfer material may be provided if necessary with a thermoplastic resin layer, a protective film and the like.

-Temporary Support-

The temporary support can be selected suitably from supports composed of chemically and thermally stable, flexible substances. Preferable examples include thin sheets or films consisting of Teflon™, polyethylene terephthalate, polycarbonate, polyethylene, polypropylene and polyester, as well as laminates thereof. Among them, a biaxially stretched polyethylene terephthalate film is particularly preferable.

The thickness of the temporary support is preferably 5 to 300 µm, preferably 20 to 150 µm. When the thickness is in this range, the temporary support can be prevented from being broken during removing thereof, and the resolution can be prevented from being decreased during exposure via the temporary support.

-Photosensitive Resin Layer-

The photosensitive resin layer is formed using the previously described deep-color composition, and its characteristics such as shape etc., its forming method etc. are the same as those of the layer formed by coating by the previously described method, and its preferable embodiments are also the same as those previously described.

-Oxygen Shielding Layer-

An oxygen shielding layer is preferably disposed between the temporary support and the photosensitive resin layer. The oxygen shielding layer is a layer having an oxygen transmission rate of 2000 $cm^3/(m^2 \cdot day \cdot atm)$ or less, and the oxygen transmission rate is preferably 100 $cm^3/(m^2 \cdot day \cdot atm)$ or less, more preferably 50 $cm^3/(m^2 \cdot day \cdot atm)$ or less. When the oxygen transmission rate is higher than 2000 $cm^3/(m^2 \cdot day \cdot atm)$, oxygen cannot be efficiently blocked, so deep-color separating walls of desired shape may not be obtained.

Specific examples include a polyvinyl ether/maleic anhydride polymer, a water-soluble salt of carboxyalkyl cellulose, water-soluble cellulose ethers, a water-soluble salt of carboxyalkyl starch, polyvinyl alcohol, polyvinyl pyrrolidone, various polyacrylamides, various water-soluble polyamides, a water-soluble salt of polyacrylic acid, gelatin, an ethylene oxide polymer, various starches and waters-soluble salts of their analogues, a styrene/maleic acid copolymer, maleinate resin, and a combination of two or more thereof, described in JP-A No. 46-2121 and JP-B 56-40824, the disclosures of which are incorporated herein by reference.

The oxygen-shielding layer is preferably a layer based on polyethylene, polyvinylidene chloride, polyvinyl alcohol (PVA) or the like (particularly a layer based on PVA) which may be compounded if necessary with polymers such as polyvinyl pyrrolidone and polyacrylamide, and is particularly preferably a layer consisting of a combination of polyvinyl alcohol and polyvinyl pyrrolidine. PVA is preferably one having a saponification degree of 80% or more, and the content of polyvinyl pyrrolidone is preferably 1 to 75% by mass, more preferably 1 to 50% by mass, still more preferably 10 to 40% by mass, based on the total solid content of the oxygen-shielding layer.

The content of PVA in the oxygen-shielding layer is preferably 25 to 99% by mass, more preferably 50 to 90% by mass, still more preferably 50 to 80% by mass. The amount of these polymers added is preferably 1 to 40% by mass, more preferably 10 to 35% by mass, based on the whole layer. When the amount of polyvinyl pyrrolidone added is too high, the oxygen shielding property may become insufficient.

-Thermoplastic Resin Layer-

On the photosensitive resin layer arranged on a temporary support, a thermoplastic resin layer may further be provided. Arrangement of such a thermoplastic resin layer is effective in improving adhesiveness to a substrate on which deep-color separating walls are formed.

The thermoplastic resin layer contains at least a resin component which is preferably alkali-soluble. The resin component is preferably an alkali-soluble thermoplastic resin having a substantial softening point of 80° C. or less.

Examples of the alkali-soluble thermoplastic resin having a softening point of 80° C. or less include, for example, saponified products of (meth)acrylate copolymers, such as a saponified product of an ethylene/acrylate copolymer, a saponified product of a styrene/(meth)acrylate copolymer, a saponified product of a vinyl toluene/(meth)acrylate copolymer, and a saponified product of a butyl (meth)acrylate/vinyl acetate.

Besides the above polymers, the organic polymers having a softening point of 80° C. or less which are described in "Plastic Seinoh Binran (Plastic Performance Handbook)" (written and edited by The Japan Plastics Industry Federation and Zennippon Plastics Seikei Kogyo Rengokai, published by Kogyo Chosakai Publishing Inc., on Oct. 25, 1968), the disclosure of which is incorporated herein by reference, and which are soluble in an aqueous alkaline solution may also be used.

Organic high-molecular substances having a softening point of 80° C. or more may be used if their substantial softening point is reduced to 80° C. or less by adding various plasticizers compatible with the organic high-molecular substances.

For the purpose of regulating the adhesion to the support, a variety of polymers, supercooling materials, an adhesion improver or a surfactant, a releasing agent, or the like may also be added to the above organic high-molecular substances in such an extent that the substantial softening point does not exceed 80° C. Preferable examples of plasticizers may include polypropylene glycol, polyethylene glycol, dioctyl phthalate, diheptyl phthalate, dibutyl phthalate, tricresyl phthalate, cresyldiphenyl phosphate, biphenyldiphenyl phosphate, and the like.

-Protective Film-

The surface of the photosensitive resin layer formed on a temporary support, or the surface of a thermoplastic resin layer formed on the photosensitive resin layer, is preferably provided with a protective film for protecting it from contamination and damage during storage. The protective film may be composed of a material identical or similar to the material of the temporary support, and easy separation thereof from the photosensitive resin layer or thermoplastic resin layer is important for excellent transfer.

Preferable examples of materials constituting the protective film include, for example, silicone paper, a polyolefin sheet and a polytetrafluoroethylene sheet. The thickness of the protective film is generally 4 to 40 µm, preferably 5 to 30 µm, more preferably 10 to 25 µm.

The photosensitive transfer material may be prepared for example by coating a temporary support with a coating solution having constituents of an oxygen-shielding layer dissolved therein, drying the coating solution to provide an oxygen-shielding layer, coating the oxygen-shielding layer with a deep-color composition prepared as described above using a solvent not dissolving the oxygen-shielding layer, drying the deep-color composition to provide a photosensitive resin layer, coating the photosensitive resin layer with a coating solution (a coating solution for a thermoplastic resin layer) having constituents of a thermoplastic resin layer dissolved in a solvent not dissolving the photosensitive resin layer, and drying the coating solution to provide a thermoplastic resin layer.

Coating may be carried out by the known coating methods described above, wherein a coating machine using a slit-shaped nozzle (slit coater) is preferably used.

Alternatively, the photosensitive transfer material may also be prepared by preparing a sheet having an oxygen-shielding layer and a photosensitive resin layer arranged on a temporary support, and a sheet having a thermoplastic resin layer arranged on a protective film, and laminating the sheets on each other such that the photosensitive resin layer is contacted with the thermoplastic resin layer, or by preparing a sheet having an oxygen-shielding layer on a temporary support, and a sheet having a thermoplastic resin layer and a photosensitive resin layer on a protective film, and laminating the sheets on each other such that the oxygen-shielding layer is contacted with the photosensitive resin layer.

-Substrate-

Examples of the substrate (permanent support) include a metallic base material, a base material of laminated metals, glass, ceramics, synthetic resin film, etc. Preferably, the substrate is one that is transparent and excellent in dimensional stability, particularly glass or synthetic resin film.

[Exposure, Development]

Exposure of the photosensitive resin layer formed as described above may be carried out by applying a light via a mask provided with desired patterns to the photosensitive resin layer. At this time, exposure is carried out preferably under a dysoxic condition. The dysoxic condition may be attained for example by providing on the photosensitive resin layer a layer capable of blocking oxygen (for example, an oxygen-shielding layer, or a temporary support left without being removed at the time of exposure when the photosensitive transfer material is used), or by using an atmosphere of an inert gas or an atmosphere under reduced pressure. Exposure is conducted particularly preferably in a dysoxic condition attained by forming an atmosphere of an inert gas or an atmosphere under reduced pressure.

The dysoxic condition refers to a condition in an inert gas atmosphere, a condition of reduced pressure, or a condition below a layer capable of blocking oxygen.

The inert gas refers to a general gas such as $N_2$, $H_2$ or $CO_2$ or a rare gas such as He, Ne or Ar. Among them, $N_2$ is preferred from the viewpoint of easy availability and costs.

The term "under reduced pressure" refers to a state at a pressure of 500 hPa or less, preferably at 100 hPa or less.

The layer capable of blocking oxygen may be an oxygen-shielding layer in the previously described photosensitive transfer material or any one of various films; for example, polyesters such as polyethylene terephthalate (PET), polyamides such as nylon, and ethylene-vinyl acetate copolymers (EVAs) are also preferable. These films may be those stretched as necessary, and the thickness thereof is preferably 5 to 300 µm, preferably 20 to 150 µm. When the photosensitive transfer material is used to prepare deep-color separating walls, a dysoxic condition is attained with a temporary support and/or an oxygen-shielding layer arranged on the photosensitive resin layer.

For example, a proximity-type exposure device provided with an ultrahigh pressure mercury lamp (manufactured by, for example, Hitachi High-Tech Electronics Engineering Co., Ltd.) may be used in exposure. Examples of the light source include medium to ultrahigh pressure mercury lamps, a xenon lamp, a metal halide lamp, and the like.

The intensity of illumination is preferably 300 mW/cm$^2$ or more, more preferably 2,000 mW/cm$^2$ or more. From the viewpoint of achieving the effect of the invention, the upper limit of the intensity of illumination is not particularly limited, and the intensity of illumination can be increased as desired as long as the apparatus and facilities used are not disturbed. The intensity of illumination can be regulated within the above range by a method of increasing the output power of a light source, increasing the number of light sources, or decreasing the distance between a light source and an object exposed to light.

After exposure, the photosensitive resin layer is developed with a developing solution to form a pattern image thereon. Thereafter, the photosensitive resin layer is washed with water if necessary.

Before development, the surface of the photosensitive resin layer is preferably uniformly moistened by spraying the photosensitive resin layer with purified water via a shower nozzle or the like. The developing solution used in development is preferably a dilute aqueous solution of an alkaline substance to which a small amount of a water-miscible organic solvent may be added.

Examples of the alkaline substance include alkali metal hydroxides (for example, sodium hydroxide, potassium hydroxide), alkali metal carbonates (for example, sodium carbonate, potassium carbonate), alkali metal bicarbonates (for example, sodium bicarbonate, potassium bicarbonate), alkali metal silicates (for example, sodium silicate, potassium silicate), alkali metal metasilicates (for example, sodium metasilicate, potassium metasilicate), triethanolamine, diethanolamine, monoethanolamine, morpholine, tetraalkyl ammonium hydroxides (for example, tetramethyl ammonium hydroxide), trisodium phosphate, etc. The concentration of the alkaline substance in the developing solution is preferably 0.01 to 30% by mass, and the pH is preferably 8 to 14.

Examples of the "water-miscible organic solvent" include, for example, methanol, ethanol, 2-propanol, 1-propanol, butanol, diacetone alcohol, ethylene glycol monomethyl ether, ethylene glycol monoethyl ether, ethylene glycol mono-n-butyl ether, benzyl alcohol, acetone, methyl ethyl ketone, cyclohexanone, $\epsilon$-caprolactone, $\gamma$-butyrolactone, dimethyl formamide, dimethyl acetamide, hexamethyl phosphoramide, ethyl lactate, methyl lactate, $\epsilon$-caprolactam, and N-methylpyrrolidone. The concentration of the water-miscible organic solvent is preferably 0.1 to 30% by mass.

A known surfactant may further be added to the developing solution, and the concentration of the surfactant is preferably 0.01 to 10% by mass.

The developing solution may be used either as a bath liquid or as a spray liquid. In order to remove non-cured portions of the photosensitive resin layer, a method of scrubbing with a rotating brush or a wet sponge in the developing solution may be used. The temperature of the developing solution is preferably in the range of around room temperature to 40° C. The development time depends on the composition of the photosensitive resin layer, on the alkalinity and temperature of the developing solution, and on the type and concentration of an organic solvent when added, but is usually 10 seconds to 2 minutes or so. Given this range, a deep-color separating wall of suitable shape can be obtained. In other words, when the development time is too short, regions to be removed by development may be insufficiently developed and may be poor in UV absorbance, while when the development time is too long, cured portions may also be etched. After development, a water washing step may be conducted.

The height of the deep-color separating wall in the invention, in the direction of a normal line to the substrate, is preferably 1.0 to 6.0 μm, more preferably 1.5 to 5.0 μm. When the height is in this range, the ink hardly gets over the deep-color separating wall in forming colored regions by the ink-jet method, bleeding and protruding of the ink are prevented, and color mixing between adjacent pixel patterns, and white deletion in an image pattern, can be prevented, so that a color filter excellent in hue with high display quality can be effectively formed.

The width of the deep-color separating wall in the invention, in a direction perpendicular to the direction of a normal line to the substrate, is preferably 5.0 μm to 50 μm.

Hereinafter, formation of the deep-color separating wall is specifically described.

(1) Formation of the Deep-Color Separating Wall by Coating with the Deep-Color Composition After a substrate is washed, the substrate is heat-treated to stabilize its surface state. Thereafter, the temperature of the substrate is regulated, and the substrate whose temperature has been regulated is coated with the deep-color composition. After coating, a part of the solvent in the coating layer is evaporated to eliminate the fluidity of the layer, and then the unnecessary coating liquid around the substrate is removed by an EBR (edge bead remover) or the like followed by pre-baking, whereby a photosensitive resin layer is obtained. Coating may be carried out using a known glass-substrate coater equipped with a slit-shaped nozzle (for example, MH-1600 manufactured by F.A.S. Asia) and the like. Drying may be carried out using a known drying device (for example, VCD (vacuum drier, manufactured by Tokyo Ohka Kogyo Co., Ltd.) etc.), and pre-baking may be carried out for example by heating at 120° C. for 3 minutes. The thickness of the photosensitive resin layer is as described above.

Subsequently, the substrate having the photosensitive resin layer formed thereon, and a mask having a pattern (for example, a quartz exposure mask), are set up perpendicularly with a distance suitably established (for example 200 μm) between the mask surface and the photosensitive resin layer and then subjected to exposure in a nitrogen atmosphere under the control of oxygen partial pressure after purging with nitrogen. Exposure may be carried out using, for example, a proximity-type exposure device provided with an ultrahigh pressure mercury lamp (manufactured by, for example, Hitachi High-Tech Electronics Engineering Co., Ltd.), and the quantity of exposure light may be suitably selected (for example 300 mJ/cm$^2$). At this time, the oxygen partial pressure may be measured with an oxygen meter (for example G-102 manufactured by IIJIMA Electronics Corporation). After exposure, the specimen is developed with a developing solution to give a pattern image thereon and washed if necessary with water to give a deep-color separating wall.

(2) Formation of the Deep-Color Separating Wall by Using the Photosensitive Transfer Material First, the protective film is separated from the photosensitive transfer material, and the exposed surface of the photosensitive resin layer is overlaid on the surface of a substrate and then passed through a laminator or the like and heated and/or pressurized to form a laminate. The laminator may be suitably selected from conventional laminators and vacuum laminators known in the art, but from the viewpoint of further improving productivity, an auto-cut laminator may be used. Then, the temporary support is removed by peeling it off from the laminate. Subsequently, a desired photomask (for example, a quartz exposure mask) is arranged on that surface (that is, the surface of the oxygen-shielding layer) of the specimen that was exposed by peeling off the temporary support. Then, the specimen is irradiated with UV ray in patterns via the mask under conditions rendered dysoxic by depressurization, and then developed with a predetermined treatment solution to give a deep-color separating wall. At this time, the specimen is subjected if necessary to washing with water. The developing solution in the development treatment and the light source used in exposure are the same as the developing solution and the light source used in the coating method described above.

[Other Steps]

The method for manufacturing a color filter according to the present invention may comprise other steps such as a baking step (described below) of further heating (baking) the formed deep-color separating walls and colored regions to cure them, a step of subjecting the deep-color separating walls on the substrate to ink repellent treatment after formation of the deep-color separating walls and before formation of the colored regions, and an OC step of forming an overcoat (OC) layer.

(Post-Exposure)

Post-exposure (also called re-exposure) is preferably carried out between development and heat treatment, from the viewpoint of control of a sectional shape of the deep-color separating wall, control of the hardness of the deep-color separating wall, control of the surface unevenness of the deep-color separating wall, and control of film reduction in the deep-color separating wall. Examples of the light source used in post-exposure include the ultrahigh pressure mercury lamp, high-pressure mercury lamp, metal halide lamp etc. described in paragraph 0074 in JP-A No. 2005-3861, the disclosure of which is incorporated herein by reference. In post-exposure, the direct irradiation of the substrate without an exposure mask or the like, with a light from a light source such as an ultrahigh pressure mercury lamp, a metal halide or the like, is preferred from the viewpoint of simplification of facilities and energy saving. If necessary, both sides of the substrate are exposed to light. For the object of control described above, the quantity of exposure light is suitably regulated in the range of 100 to 2000 mJ/cm$^2$ for the upper surface and in the range of 100 to 2000 mJ/cm$^2$ for the lower surface.

(Heat Treatment)

By heat treatment (also called post-baking), the monomers, the crosslinking agent etc. contained in the photosensitive resin layer of the invention can be allowed to react thereby securing the hardness of the deep-color separating wall. The temperature in heat treatment is preferably in the range of 150° C. to 250° C. When the temperature is less than 150° C., the hardness may be insufficient, while when the temperature is more than 250° C., the resin may be colored to deteriorate color purity. The time of heat treatment is preferably 10 minutes to 150 minutes. When the time is less than 10 minutes, the hardness may be insufficient, while when the time is more than 150 minutes, the resin may be colored to deteriorate color purity. The heat treatment may vary according to color. After all colors are formed by the ink-jet method described above, final heat treatment may be further conducted to stabilize the hardness. In this case, it is preferable from the viewpoint of hardness that the heat treatment is conducted at a rather high temperature (for example 240° C.).

Examples of the ink repellent treatment include, for example, (1) a method of kneading an ink-repellent substance into a deep-color separating wall (see, for example, JP-A No. 2005-36160, the disclosure of which is incorporated herein by reference), (2) a method of newly providing an ink-repellent layer (see, for example, JP-A No. 5-241011, the disclosure of which is incorporated herein by reference), (3) a method of conferring ink repellency by plasma treatment (see, for example, JP-A No. 2002-62420, the disclosure of which is incorporated herein by reference), and (4) a method of coating the upper surface of a deep-color separating wall with an ink-repellent material (see, for example, JP-A No. 10-123500, the disclosure of which is incorporated herein by reference), among which (3) the method of subjecting a deep-color separating wall formed on a substrate to ink repellent treatment by plasma is particularly preferable.

After the colored regions (colored pixels) and the deep-color separating walls are formed as described above to form a color filter, an overcoat layer may be formed so as to cover the whole area of the colored regions and the deep-color separating walls, for the purpose of improving resistance.

The overcoat layer can protect the colored regions of R, G, B etc. and the deep-color separating walls, and can flatten the surface. However, the overcoat layer is preferably not provided from the viewpoint of increase in the number of steps.

The overcoat layer can be composed using a resin (OC agent), and examples of the resin (OC agent) include an acrylic resin composition, an epoxy resin composition, a polyimide resin composition, and the like. Among them, the acrylic resin composition is desirable because this composition gives a layer excellent in transparency in the visible region and further because the resin component of a photo-curable composition for color filter is usually based on an acrylic resin to which the acrylic resin composition is excellent in adhesiveness. Examples of the overcoat layer include those described in paragraphs [0018] to [0028] in JP-A No. 2003-287618, the disclosure of which is incorporated herein by reference, and a commercial overcoat agent Optomer SS6699G manufactured by JSR Corporation.

The color filter of the invention is produced by the above-described method for manufacturing a color filter according to the invention, and can be preferably used in applications including, but not limited to, TV sets, personal computers, liquid crystal projectors, game machines, mobile terminals such as cellular phones, digital cameras, car navigation systems, etc.

<Display Device>

The display device of the invention is not particularly limited as long as it is provided with the above-described color filter of the invention, and examples of the display device of the invention include display devices such as liquid crystal display devices, plasma display devices, EL display devices and CRT display devices. Definition of display devices and description of each display device are set forth in, for example, "Denshi Display Device (Electronics Display Device)" authored by Teruo Sasaki and published by Kogyo Chosakai Publishing, Inc. (1990) and "Display Device" authored by Sumiaki Ibuki and published by Sangyo-Tosho (1989), the disclosures of which are incorporated herein by reference.

Among the display devices of the invention, the liquid display device is particularly preferable. Liquid crystal display devices are described in, for example, "Jisedai Ekisho Display Gijyutsu (Next-Generation Liquid Crystal Display Technology)" edited by Tatsuo Uchida and published by Kogyo Chosakai Publishing, Inc. (1994), the disclosure of which is incorporated herein by reference. The liquid crystal display device to which the invention can be applied is not particularly limited, and the invention can be applied for example to liquid crystal display devices in various systems described in "Jisedai Ekisho Display Gijyutsu" supra. Among them, the invention is particularly effective for liquid crystal display devices in color TFT system. The liquid crystal display devices in color TFT system are described in, for example, "Color TFT Ekisho Display (Color TFT Liquid Crystal Display)" published by Kyoritsu Shuppan Co., Ltd. (1996), the disclosure of which is incorporated herein by reference. As a matter of course, the invention can also be applied to liquid crystal displays with an enlarged view angle such as in a transversal electric field driving system for IPS etc. and in a pixel segmentation system for MVA etc. These systems are described for example on page 43 in "EL, PDP, LCD Display -Gijyutsu to Shijyo no Saishin Doko- (EL, PDP, LCD Displays -Leading-Edge Trend in Technology & Market-)" published by Research Study Division, Toray Research Center, Inc. (2001), the disclosure of which is incorporated herein by reference.

The liquid display device is composed of various members including not only a color filter but also an electrode substrate, a polarizing film, a phase difference film, a backlight, a spacer, a view-angle compensation film, etc. The color filter of the invention can be applied to the liquid crystal display device composed of these members known in the art. These members are described in, for example, "'94 Ekisho Display Shuhen Zairyo-Chemicals no Shijyo ('94 Market of Liquid Crystal Display Peripheral Materials/Chemicals)", Kentaro Shima, published by CMC Publishing Co., Ltd. (1994), "2003 Ekisho Kanren Shijyo no Genjyo to Shorai Tenbo (Gekan) (Current Status of Liquid Crystal-Related Market in 2003 & Future Perspective, Second Volume", Ryokichi Omote, published by Fuji Chimera Research Institute Inc. (2003), the disclosures of which are incorporated herein by reference.

The display device of the invention can adopt various display modes such as ECB (electrically controlled birefringence), TN (twisted nematic), IPS (in-plane switching), FLC (ferroelectric liquid crystal), OCB (optically compensatory bend), STN (super twisted nematic), VA (vertically aligned), HAN (hybrid aligned nematic) and GH (guess host). By using the color filter described above, the display device of the invention when mounted on TV sets or monitors can attain a wide color reproduction range and high contrast ratio without causing display unevenness, and can also be preferably used as a large-screen display device such as in notebook computers and TV monitors.

EXAMPLES

Hereinafter, the invention is described in more detail by reference to the Examples. The materials, reagents, proportions, instruments, operations etc. shown in the following examples may be suitably changed so as not to depart from the scope of the invention. Accordingly, the scope of the invention is not limited to the specific examples shown below.

Example 1

Method for Manufacturing a Deep-Color Composition for Forming Deep-Color Separating Walls A deep-color composition K1 is obtained as follows. First, a K pigment dispersion 1 and propylene glycol monomethyl ether acetate are weighed out in the amounts shown in Table 1, then mixed with each other at a temperature of 24° C. (±2° C.) and stirred at 150 rpm for 10 minutes. Then, methyl ethyl ketone, a binder 2, hydroquinone monomethyl ether, a DPHA solution, 2,4-bis(trichloromethyl)-6-[4'-(N,N-diethoxycarbonylmethyl) amino-3'-bromophenyl]-s-triazine, and a surfactant 1 are weighed out respectively in the amounts shown in Table 1, then added in this order to the above pigment mixture at a temperature of 25° C. (±2° C.), and stirred at a temperature of 40° C. (±2° C.) at 150 rpm for 30 minutes, thereby giving the objective deep-color composition K1. The amounts shown in Table 1 are expressed in parts by mass, which are specifically as follows:

<K Pigment Dispersion 1>
Carbon black (trade name: NIPEX 35, manufactured by Degussa): 13.1 parts by mass
Dispersant 1 below (Et represents an ethyl group): 0.65 part by mass
Polymer (benzyl methacrylate/methacrylic acid (=78/28 molar ratio) random copolymer with a molecular weight of 37,000): 6.72 parts by mass
Propylene glycol monomethyl ether acetate: 79.53 parts by mass

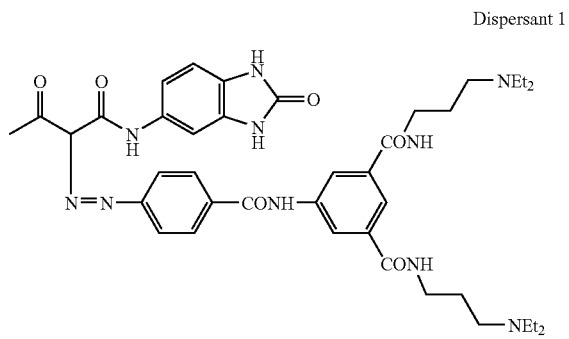

Dispersant 1

<Binder 2>
Polymer (benzyl methacrylate/methacrylic acid (=78/22 molar ratio) random copolymer with a molecular weight of 38,000): 27 parts by mass
Propylene glycol monomethyl ether acetate: 73 parts by mass
<DPHA Solution>
Dipentaerythritol hexaacrylate (trade name: KAYARAD DPHA, containing 500 ppm polymerization inhibitor MEHQ, manufactured by Nippon Kayaku Co., Ltd.): 76 parts by mass
Propylene glycol monomethyl ether acetate: 24 parts by mass
<Surfactant 1>
Structure 1 below: 30 parts by mass
Methyl ethyl ketone: 70 parts by mass

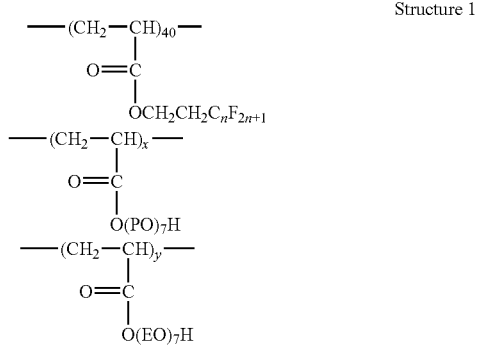

Structure 1

($n=6$, $x=55$, $y=5$, Mw=33940, Mw/Mn=2.55 PO, propylene oxide; EO, ethylene oxide)

TABLE 1

| Deep-Color Composition | K1 |
|---|---|
| K Pigment dispersion 1 | 10 parts by mass |
| Propylene glycol monomethyl ether acetate | 8 parts by mass |
| Methyl ethyl ketone | 53 parts by mass |
| Binder 2 | 9.1 parts by mass |
| Hydroquinone monomethyl ether | 0.002 parts by mass |
| DPHA solution | 4.2 parts by mass |
| 2,4-bis(Trichloromethyl)-6-[4'-(N,N-diethoxycarbonylmethyl)amino-3'-bromophenyl]-s-triazine | 0.16 parts by mass |
| Surfactant 1 | 0.044 parts by mass |

[Preparation of Deep-Color Separating Walls]

An alkali-free glass substrate was washed with a UV cleansing apparatus, then washed with a brush using a detergent and further washed by ultrasonic cleaning with ultrapure water. The substrate was heat-treated at 120° C. for 3 minutes to stabilize its surface state.

The substrate was cooled, then regulated at a temperature of 23° C., and coated with a deep-color composition K1 consisting of the composition shown in the above table, by using a glass-substrate coater equipped with a slit-shaped nozzle (trade name: MH-1600 manufactured by F.A.S. Asia). Subsequently, a part of the solvent was evaporated for 30 seconds with VCD (vacuum drier, manufactured by Tokyo Ohka Kogyo Co., Ltd.) to eliminate the fluidity of the coating layer, and the specimen was pre-baked at 120° C. for 3 minutes to give a deep-color composition layer K1 of 2.0 μm in thickness.

The substrate and a mask (a quartz exposure mask having an image pattern) were set up perpendicularly with a distance of 200 μm between the surface of the exposure mask and the deep-color composition layer K1, and then patternwise exposed in a nitrogen atmosphere to 300 mJ/cm$^2$ light using a proximity-type exposure device provided with an ultrahigh pressure mercury lamp (manufactured by Hitachi High-Tech Electronics Engineering Co., Ltd.).

Then, the surface of the deep-color composition layer K1 was uniformly moistened by spraying it with purified water via a shower nozzle, and then developed at 23° C. for 80 seconds with a shower of a KOH-type developing solution (trade name: CDK-1, containing KOH and a nonionic surfactant, manufactured by Fuji Film Electronics Materials) at a pressure of 0.04 MPa in a flat nozzle, to give a patterning image. Subsequently, residues were removed with ultrapure water jetted at a pressure of 9.8 MPa from an ultrahigh-pressure washing nozzle, and the specimen was subjected to post-exposure to 2000 mJ/cm$^2$ light in the air to give deep-color separating walls with an optical density of 3.9.

[Preparation of Ink]

Preparation of ink liquid

The components in Table 2 below were mixed with one another and stirred for 1 hour with a stirrer. After stirring, the mixture was dispersed with an Eiger mill to give PR254 dispersion liquid Nos. 1 to 3 and PR177 dispersion liquid No. 1. The PR254 dispersion liquid Nos. 1 to 3 and PR177 dispersion liquid No. 1 thus prepared were further mixed according to the compositions shown in Table 3 and then stirred for 1 hour with a stirrer to give R ink 1 to R ink 5, R ink 11 and R ink 12.

TABLE 2

|  | PR254 dispersion liquid | | | PR177 dispersion liquid |
|---|---|---|---|---|
|  | No. 1 | No. 2 | No. 3 | No. 1 |
| C.I.P.R. 254 (trade name: IRGAPHOR RED B-CF, manufactured by Ciba Specialty Chemicals) | 8.0 | 8.0 | 8.0 | 0 |
| C.I.P.R. 177 (trade name: CROMOPHTAL RED A2B, manufactured by Ciba Specialty Chemicals) | 0 | 0 | 0 | 18.0 |
| Benzyl methacrylate/methacrylic acid (=72/28 molar ratio) random copolymer, MW 30,000 | 8.8 | 2.08 | 1.04 | 12.0 |
| Propylene glycol monomethyl ether acetate | 83.2 | 89.9 | 91.0 | 70.0 |

(Unit: parts by mass)

TABLE 3

|  |  | R ink 1 | R ink 2 | R ink 3 | R ink 4 | R ink 5 | R ink 11 | R ink 12 |
|---|---|---|---|---|---|---|---|---|
| Composition (parts by mass) | PR254 dispersion liquid No. 1 | 40 | 42 | 44 | 46 | 0 | 40 | 0 |
|  | PR254 dispersion liquid No. 2 | 0 | 0 | 0 | 0 | 48 | 0 | 0 |
|  | PR254 dispersion liquid No. 3 | 0 | 0 | 0 | 0 | 0 | 0 | 48 |
|  | PR177 dispersion liquid No. 1 | 4.5 | 4.7 | 5.0 | 5.2 | 5.5 | 4.5 | 5.5 |
|  | methyl ethyl ketone | 45 | 45 | 45 | 45 | 45 | 45 | 45 |
|  | binder 1 | 1.8 | 0.9 | 0.7 | 0.7 | 0.7 | 1.8 | 0 |
|  | 2-trichloromethyl-5-(p-styrylstyryl)-1,3,4-oxadiazole | 0.12 | 0.12 | 0.12 | 0.12 | 0.05 | 0.12 | 0.12 |
|  | 2,4-bis(trichloromethyl)-6-[4'-(N,N-diethoxycarbonylmethyl) amino-3'-bromophenyl]-s-triazine | 0.05 | 0.05 | 0.05 | 0.05 | 0.03 | 0.05 | 0.05 |
|  | phenothiazine | 0.01 | 0.01 | 0.01 | 0.01 | 0.01 | 0.01 | 0.01 |
|  | DPHA solution | 9.9 | 7.4 | 3.8 | 1.9 | 1.0 | 16.0 | 0 |
| Content (mass %) of the pigments in the solid content | | 25 | 29 | 36 | 42 | 64 | 19 | 78 |
| Content (mass %) of C.I.P.R. 254 in the solid content | | 20 | 23 | 29 | 33 | 51 | 15 | 62 |
| Content (mass %) of C.I.P.R. 177 in the solid content | | 5.0 | 5.8 | 7.4 | 8.4 | 13 | 3.9 | 16 |

<Binder 1>

Polymer (benzyl methacrylate/methacrylic acid/methyl methacrylate (=38/25/37 molar ratio) random copolymer, weight-average molecular weight of 38,000): 27 parts by mass Propylene glycol monomethyl ether acetate: 73 parts by mass The components in Table 4 below were mixed with one another and stirred for 1 hour with a stirrer. After stirring, the mixture was dispersed with an Eiger mill to give PG36 dispersion liquid Nos. 1 to 2 and PY150 dispersion liquid No. 1. The PG36 dispersion liquid Nos. 1 to 2 and PY150 dispersion liquid No. 1 thus prepared were further mixed according to the compositions shown in Table 5 and then stirred for 1 hour with a stirrer to give G ink 1 to G ink 5, G ink 11 and G ink 12.

TABLE 4

|  | PG36 dispersion liquid | | PY150 dispersion liquid |
|---|---|---|---|
|  | No. 1 | No. 2 | No. 1 |
| C.I.P.G. 36 (trade name: RIONOL GREEN 6YK, manufactured by Toyo Ink Mfg. Co., Ltd.) | 18 | 18 | 0 |
| C.I.P.Y. 150 (trade name: CF YELLOW EX3393, manufactured by Mikuni Color Ltd.) | 0 | 0 | 100 |
| Benzyl methacrylate/methacrylic acid (=72/28 molar ratio) random copolymer, MW 30,000 | 12 | 5 | 0 |
| Propylene glycol monomethyl ether acetate | 32 | 39 | 0 |
| Cyclohexanone | 38 | 38 | 0 |

(unit: parts by mass)

TABLE 5

|  |  | G ink 1 | G ink 2 | G ink 3 | G ink 4 | G ink 5 | G ink 11 | G ink 12 |
|---|---|---|---|---|---|---|---|---|
| Composition (parts by mass) | PG36 dispersion liquid No. 1 | 28 | 26 | 24 | 21 | 19 | 28 | 0 |
|  | PG36 dispersion liquid No. 2 | 0 | 0 | 0 | 0 | 0 | 0 | 19 |
|  | PY150 dispersion liquid No. 1 | 15 | 14 | 13 | 11 | 10 | 15 | 10 |
|  | methyl ethyl ketone | 55 | 55 | 55 | 55 | 55 | 55 | 55 |
|  | cyclohexanone | 1.3 | 1.3 | 1.3 | 1.3 | 1.3 | 1.3 | 1.3 |
|  | binder 2 | 2.5 | 2.5 | 2.5 | 2.5 | 1.5 | 2.5 | 0.0 |
|  | 2-trichloromethyl-5-(p-styrylstyryl)-1,3,4-oxadiazole | 0.12 | 0.12 | 0.12 | 0.12 | 0.012 | 0.12 | 0.012 |

TABLE 5-continued

|  | G ink 1 | G ink 2 | G ink 3 | G ink 4 | G ink 5 | G ink 11 | G ink 12 |
|---|---|---|---|---|---|---|---|
| 2,4-bis(trichloromethyl)-6-[4'-(N,N-diethoxycarbonylmethyl) amino-3'-bromophenyl]-s-triazine | 0.05 | 0.05 | 0.05 | 0.05 | 0.005 | 0.05 | 0.005 |
| phenothiazine | 0.005 | 0.005 | 0.005 | 0.005 | 0.005 | 0.005 | 0.005 |
| DPHA solution | 20 | 7.4 | 3.5 | 1.9 | 0.4 | 38 | 0.3 |
| Content (mass %) of the pigments in the solid content | 26 | 39 | 46 | 50 | 57 | 18 | 73 |
| Content (mass %) of C.I.P.G. 36 in the solid content | 18 | 27 | 32 | 35 | 40 | 12 | 51 |
| Content (mass %) of C.I.P.Y. 150 in the solid content | 7.9 | 12 | 14 | 15 | 17 | 5.3 | 22 |

The components in Table 6 below were mixed with one another and stirred for 1 hour with a stirrer. After stirring, the mixture was dispersed with an Eiger mill to give PB15:6 dispersion liquid No. 1 and PB15:6+PV23 dispersion liquid No. 1. The PB15:6 dispersion liquid No. 1 and PB15:6+PV23 dispersion liquid No. 1 thus prepared were further mixed according to the compositions shown in Table 7 and then stirred for 1 hour with a stirrer to give B ink 1 to B ink 5, B ink 11 and B ink 12.

TABLE 6

|  | PB 15:6 dispersion liquid No. 1 | PB 15:6 + PV 23 dispersion liquid No. 1 |
|---|---|---|
| C.I.P.B. 15:6 (trade name: CF BLUE EX3357, manufactured by Mikuni Color Ltd.) | 100 | 0 |
| C.I.P.B. 15:6 + C.I.P.V. 23 (trade name: CF BLUE EX3383, manufactured by Mikuni Color Ltd.) | 0 | 100 |

(unit: parts by mass)

Discharge of the ink from the head is regulated by a piezoelectric driving signal applied to the head, to enable 6 to 42 pl to be discharged per droplet, and in this example, droplets from the head are jetted onto a glass substrate that is being delivered in a position 1 mm below the head. The delivery speed may be set in the range of 50 to 200 mm/s. The piezoelectric driving frequency may be set up to 4.6 KHz at a maximum, and by setting them, the amount of droplets to be jetted can be regulated.

TABLE 7

|  |  | B ink 1 | B ink 2 | B ink 3 | B ink 4 | B ink 5 | B ink 11 | B ink 12 |
|---|---|---|---|---|---|---|---|---|
| Composition (parts by mass) | PB 15:6 dispersion liquid No. 1 | 8.6 | 8.4 | 8.0 | 7.6 | 7.4 | 8.6 | 7.4 |
|  | PB 15:6 + PV 23 dispersion liquid No. 1 | 15 | 15 | 14 | 13 | 13 | 15 | 13 |
|  | methyl ethyl ketone | 54 | 54 | 54 | 54 | 54 | 54 | 54 |
|  | binder 3 | 20 | 19 | 17 | 8.0 | 4.0 | 25 | 0 |
|  | 2,4-bis(trichloromethyl)-6-[4-(N,N-diethoxycarbonyl-methyl) amino-3-bromophenyl]-s-triazine | 0.19 | 0.18 | 0.16 | 0.07 | 0.04 | 0.23 | 0 |
|  | phenothiazine | 0.020 | 0.020 | 0.020 | 0.020 | 0.020 | 0.020 | 0.02 |
|  | DPHA solution | 6.0 | 5.5 | 4.0 | 2.5 | 1.5 | 10 | 1.0 |
| Content (mass %) of the pigments in the solid content |  | 21 | 22 | 24 | 34 | 44 | 16 | 59 |
| Content (mass %) of C.I.P.B. 15:6 in the solid content |  | 20 | 21 | 23 | 32 | 42 | 16 | 56 |
| Content (mass %) of C.I.P.V. 23 in the solid content |  | 1.2 | 1.3 | 1.4 | 2.0 | 2.6 | 0.9 | 3.4 |

<Binder 3>
Polymer (benzyl methacrylate/methacrylic acid/methyl methacrylate (=36/22/42 molar ratio) random copolymer, weight-average molecular weight of 38,000): 27 parts by mass
Propylene glycol monomethyl ether acetate: 73 parts by mass

[Method of Recording R, G and B Pixels by the Inks]

Droplets of the R ink 1, G ink 1 and B ink 1 obtained above were discharged via piezoelectric heads onto concave portions enclosed by the deep-color separating walls, as follows.

Two heads each having 318 nozzles at a density of 150 nozzles per 25.4 mm were fixed such that in the direction of an array of nozzles, the heads were shifted from each other by half of the nozzle interval, thereby allowing 300 droplets to be discharged onto a substrate per 25.4 mm in the direction of the nozzle array.

The head and ink are regulated at 50±0.5° C. in the vicinity of the discharging portion by circulating heated water through the head.

In this example, the delivery speed and drive frequency were regulated such that the R, G and B pigments are applied in amounts of 1.1, 1.6 and 0.7 g/m² respectively, and the R, G and B inks were jetted onto their desired corresponding concave portions, respectively.

The jetted inks are delivered to a place where they are to be exposed, followed by exposure to a light from an UV light emitting diode (UV-LED). The UV-LED used in this example was NCCU033 manufactured by Nichia Corporation. This LED is one outputting UV light with a wavelength of 365 nm from one chip, and by applying bout 500 mA current, about 100 mW light is emitted from the chip. By arranging plural chips at 7-mm intervals, a power of 0.3 W/cm² is given at the surface. The time from discharge of droplets to exposure, and the exposure time, can be changed by the delivery speed of media and the distance between the head and LED in the direction of delivery. In this example, the inks after reaching the media is dried at 100° C. for 1 minute, and about 0.5 second thereafter, the inks are exposed to light. The energy of exposure light on the media may be regulated in the range of 0.01 to 15 J/cm² depending on the setting of the distance and delivery speed. In this example, the energy of exposure light was regulated by the delivery speed.

The exposure power and exposure energy were measured with a spectroradiometer URS-40D manufactured by Ushio Inc., and the integrated value thereof at wavelengths from 220 nm to 400 nm was used.

The glass substrate onto which the droplets were discharged was baked for 30 minutes in an oven at 230° C., thereby completely curing both the deep-color separating walls and the respective pixels.

(Preparation of a Liquid Crystal Display Device Mounted with the Color Filter)

A liquid crystal display device was prepared by the following procedures, to evaluate the color filter prepared in the example shown above.

(Formation of an ITO Electrode)

The glass substrate having the color filter in Example 1 formed thereon was introduced into a sputtering apparatus where ITO (indium tin oxide) of 1300 Å in thickness was vacuum-deposited on the whole surface of the substrate and then annealed at 240° C. for 90 minutes to crystallize the ITO, thereby forming an ITO transparent electrode.

(Formation of a Spacer)

On the ITO transparent electrode prepared above, a spacer was formed by the same method as a spacer-forming method described in Example 1 in JP-A No. 2004-240335, the disclosure of which is incorporated therein by reference.

(Formation of a Protrusion for Regulation of Liquid-Crystal Molecular Orientation)

Using a coating solution for a positive type photosensitive resin layer shown below, a protrusion for regulation of liquid-crystal molecular orientation was formed on the ITO transparent electrode having the spacer formed thereon. In an exposure step, a development step and a baking step, the following method was used.

A proximity-type exposure device (manufactured by Hitachi High-Tech Electronics Engineering Co., Ltd.) was arranged such that a predetermined photomask was 100 μm apart from the surface of the photosensitive resin layer, and a proximity exposure with an irradiation energy of 150 mJ/cm² was carried out via the photomask with an ultrahigh pressure mercury lamp.

Subsequently, the substrate was developed by spraying it with 2.38% aqueous tetramethyl ammonium hydroxide at 33° C. for 30 seconds with a shower type developing apparatus. Unnecessary portions (exposed portions) of the photosensitive resin layer were removed by development, whereby a substrate for a liquid crystal display device consisting of the photosensitive resin layer patterned in a desired shape at the side of the color-filter on the substrate, in which a protrusion for regulating liquid-crystal molecular orientation had been formed, was obtained.

Then, the substrate for a liquid crystal display device in which a protrusion for regulating liquid-crystal molecular orientation had been formed was baked at 230° C. for 30 minutes to form a cured protrusion for regulating liquid-crystal molecular orientation on the substrate for a liquid crystal display device.

<Formulation of a Coating Solution for a Positive Type Photosensitive Resin Layer>
Positive type resist solution (trade name: FH-2413F, manufactured by Fuji Film Electronics Materials): 53.3 parts by mass
Methyl ethyl ketone: 46.7 parts by mass
Megaface F-780F (manufactured by Dainippon Ink And Chemicals, Inc.): 0.04 part by mass <Preparation of a Liquid Crystal Display Device>

The substrate for a liquid crystal display device obtained above was further provided with an oriented film consisting of polyimide.

Thereafter, a sealing agent of epoxy resin was printed on a position corresponding to an outer frame of black matrix arranged so as to enclose a group of pixels in the color filter, and a liquid crystal for MVA mode was dropped on the substrate, which was then laminated with an opposed substrate, and the laminated substrate was heat-treated to cure the sealing agent. A polarizing plate HLC2-2518 manufactured by SANRITSU Corp. was laminated on both sides of the thus obtained liquid crystal cell, respectively. Then, a backlight of a 3-wavelength cold-cathode tube light source (trade name: FWL18EX-N, manufactured by Toshiba Lighting & Technology Corporation) was constituted, and arranged on the backside of the liquid crystal cell provided with the polarizing plate, to constitute a liquid crystal display device.

Examples 2 to 5

Liquid crystal display devices were prepared in the same manner as in Example 1 except that R inks 2 to 5, G inks 2 to 5 and B inks 2 to 5 were used respectively in place of the R ink 1, G ink 1 and B ink 1 used in Example 1.

Comparative Examples 1 and 2

Liquid crystal display devices were prepared in the same manner as in Example 1 except that R inks 11 to 12, G inks 11 to 12 and B inks 11 to 12 were used respectively in place of the R ink 1, G ink 1 and B ink 1 used in Example 1.

Example 6

The components in Table 8 below were mixed with one another and stirred for 1 hour with a stirrer. After stirring, the mixture was dispersed with an Eiger mill to give R pigment dispersion liquid 1, G pigment dispersion liquid 1, and B pigment dispersion liquid 1. The dispersing conditions were that zirconia beads of 0.65 mm in diameter were charged at a charging degree of 70%, the circumferential velocity was 9 m/s, and the dispersing time was 1 hour. The R pigment dispersion liquid 1, G pigment dispersion liquid 1, and B pigment dispersion liquid 1 thus prepared were further mixed according to the compositions shown in Table 9 and then stirred for 1 hour with a stirrer to give R ink 6, G ink 6 and B ink 6.

TABLE 8

|  | R pigment dispersion liquid 1 | G pigment dispersion liquid 1 | B pigment dispersion liquid 1 |
|---|---|---|---|
| C.I.P.R. 254 (trade name: IRGAPHOR RED B-CF, manufactured by Ciba Specialty Chemicals) | 9.8 | — | — |
| C.I.P.R. 177 (trade name: CROMOPHTAL RED A2B, manufactured by Ciba Specialty Chemicals) | 2.5 | — | — |

TABLE 8-continued

|  | R pigment dispersion liquid 1 | G pigment dispersion liquid 1 | B pigment dispersion liquid 1 |
|---|---|---|---|
| C.I.P.G. 36 (trade name: RIONOL GREEN 6YK, manufactured by Toyo Ink Mfg. Co., Ltd.) | — | 11 | — |
| C.I.P.Y. 150 (trade name: BAYPLAST YELLOW 5GN 01, manufactured by Bayer) | — | 4.5 | — |
| C.I.P.B. 15:6 (trade name: RIONOL BLUE ES, manufactured by Toyo Ink Mfg. Co., Ltd.) | — | — | 7.1 |
| C.I.P.V. 23 (trade name: HOSTAPERM VIOLET RL-NF, manufactured by Clariant Japan) | — | — | 0.79 |
| Monomer; HDODA (manufactured by DAICEL-CYTEC Corporation) | 25 | 20 | 20 |
| Dispersant; BYK-168 (manufactured by BYK Chemie Japan) | 8 | 10 | 5 |

(Unit: parts by mass)

TABLE 9

|  |  | R ink 6 | G ink 6 | B ink 6 |
|---|---|---|---|---|
| Composition (parts by mass) | R pigment dispersion liquid 1 | 200 | — | — |
|  | G pigment dispersion liquid 1 | — | 200 | — |
|  | B pigment dispersion liquid 1 | — | — | 20 |
|  | Monomer; DPCA60 (manufactured by Nippon Kayaku Co., Ltd.) | 0.9 | 0.8 | 0.9 |
|  | Monomer; HDODA (manufactured by DAICEL-CYTEC Corporation) | 10 | 10 | 10 |
|  | Photopolymerization initiator; IRGACURE 1870 (manufactured by Ciba Specialty Chemicals) | 3.9 | 3.9 | 3.9 |
| Content (mass %) of C.I.P.R. 254 in the solid content |  | 20 |  |  |
| Content (mass %) of C.I.P.R. 177 in the solid content |  | 5.6 |  |  |
| Content (mass %) of C.I.P.G. 36 in the solid content |  |  | 21 |  |
| Content (mass %) of C.I.P.Y. 150 in the solid content |  |  | 9.3 |  |
| Content (mass %) of C.I.P.B. 15:6 in the solid content |  |  |  | 20 |
| Content (mass %) of C.I.P.V. 23 in the solid content |  |  |  | 1.9 |

A liquid crystal display device was prepared in the same manner as in Example 1 except that R ink 6, G ink 6 and B ink 6 were used in place of R ink 1, G ink 1 and B ink 1 used in Example 1, and droplets about 0.5 second after reaching the medium were exposed to light without drying.

Comparative Example 3

[Preparation of G Ink 13]

The pigment and dispersant shown in Table 10 below were dispersed together with a monomer (1) below by the method described above, to give a stock solution of ink.

Then, a photopolymerization initiator (2) below was added to the stock solution of ink and mixed gently until the photopolymerization initiator was dissolved in the stock solution of ink, which was then subjected to the filtration step described above to give G ink 13.

Formulation of a Monomer (1)

Trimethylol propane triacrylate (trade name: KS-TMPTA, manufactured by Nippon Kayaku Co., Ltd.): 50 parts by mass N-vinylformamide (trade name: BEAMSET 770, manufactured by Arakawa Chemical Industries, Ltd.): 40 parts by mass (2) Formulation of a Photopolymerization Initiator Irgacure 907: 6.5 parts by mass Isopropyl thioxanthone: 3.5 parts by mass

TABLE 10

|  |  | G ink 13 |
|---|---|---|
| Pigment | P1 | 5.0 |
| Dispersant | 13940 | 0.2 |
|  | 5000 | 0.15 |

(unit: parts by mass)

Preparation of the Pigment (P1) in Table 10

250 parts by mass of crude copper phthalocyanine ("CUPPER PHTHALOCYANINE" manufactured by Toyo Ink Mfg. Co., Ltd.), 2500 parts by mass of sodium chloride, and 160 parts by mass of polyethylene glycol ("POLYETHYLENE GLYCOL 300" manufactured by Tokyo Chemical Industry Co., Ltd.) were charged into a stainless steel 1-gallon kneader (manufactured by Inoue Seisakusho Co., Ltd.) and kneaded for 3 hours. Then, the resulting mixture was introduced into 2.5-L heated water and stirred with a high-speed mixer (manufactured by Fukae Powtec Co., Ltd.) for about 1 hour under heating at about 80° C. to form slurry, which was then filtered and washed with water repeatedly 5 times to remove sodium chloride and the solvent and then spray-dried to give a dried treated pigment.

In the item Dispersant in Table 10, "13940" refers to a polyester amine-type dispersant (trade name: SOLSPERSE 13940, manufactured by Zeneca K.K.) and "5000" refers to a blue pigment dispersant (trade name: SOLSPERSE 5000, manufactured by Zeneca K.K.).

A liquid crystal display device in Comparative Example 3 was prepared in the same manner as in Example 1 except that the above-mentioned G ink 13 was used in place of G ink 1 used in Example 1.

The color filters and liquid crystal display devices obtained in Examples 1 to 6 and Comparative Examples 1 to 3 were evaluated as follows. The results are shown in Table 11.

[Color Mixing Due to Satellite]

The color filter was observed both with the naked eye and under an optical microscope to examine whether color mixing due to a satellite mist of each color pixel had occurred or not. Numerical values in Table 11 indicate the number of pixels with color mixing when 100 pixels were observed under an optical microscope. The results are shown in Table 11. The numerical value in Table 11 is the number of pixels with color mixing.

A: No color mixing is observed under an optical microscope.
   B: No color mixing can be confirmed with the naked eye, but color mixing is observed under an optical microscope.
   C: color mixing is observed with the naked eye.

[White Deletion]

The color filter was observed both with the naked eye and under an optical microscope to examine whether white deletion of the each color pixel had occurred or not. Numerical values in Table 11 indicate the number of white deletion when 100 pixels were observed under an optical microscope. The results are shown in Table 11. The numerical value in Table 11 is the number of white deletion.

A: No satellite is observed under an optical microscope.
   B: No satellite can be confirmed with the naked eye, but a satellite is observed under an optical microscope.
   C: A satellite is observed with the naked eye.

[Color Tone]

The resulting liquid crystal display device, when one color of R, G or B was displayed, was measured for its chromaticity (NTSC ratio, color tone). For measurement of chromaticity, a color luminance meter (trade name: BM-5, manufactured by TOPCON) was used. The results are shown in Table 11.

In this measurement of chromaticity, the color luminance meter was arranged in the direction of a normal line to the center of the display with no incident light from the environment, and the observation distance was 50 cm.

The range of color reproduction is determined by the color of a light emitted from red, green or blue pixel, and when the chromaticity points of the respective pixels in the CIE XYZ color coordinate system are $(x_R, y_R)$, $(x_G, y_G)$ and $(x_B, y_B)$ respectively, the range of color reproduction is expressed by the area of a triangle surrounded by these 3 points on the x-y chromaticity diagram. That is, as the area of this triangle is increased, a more vivid color image can be reproduced. The area of this triangle is usually expressed as the ratio to the area of the triangle as a standard formed by three points of 3 primary colors, that is, red (0.67, 0.33), green (0.21, 0.71) and blue (0.14, 0.08) in a standard system prescribed by National Television System Committee (NTSC), US (unit: %, hereinafter abbreviated to "NTSC ratio"). This value is about 40 to 50% for general notebook computers, 50 to 60% for monitors for desktop computers, and about 70% for current LCD TV.

In recent years, there is increasing demand for color liquid crystal display devices capable of further improving the color reproduction of the liquid display devices to express more vivid color images. Specifically, there is demand for displays of high color purity with an NTSC ratio of 80% or more. In the present evaluation, A was given where the NTCS ratio was 80% or more, and C was given where the ratio was less than 80%.

[Display Unevenness]

The liquid crystal display device, when white or black was displayed, was examined for its display unevenness and evaluated under the following criteria.

A: No unevenness is observed in white display and in black display.
   B: Unevenness is not observed in black display, but is observed in white display.
   C: Unevenness is observed in white display and in black display.

-Judgment-

From the above evaluation, the color filter and liquid crystal display device were comprehensively judged on the basis of the following criteria:

A: Both the color filter and the liquid crystal display device are excellent.
   C: Either the color filter or the liquid crystal display device is extremely problematic.

TABLE 11

|  | Color filter | | Liquid crystal display device | | |
|---|---|---|---|---|---|
|  | Color mixing due to satellite | White deletion | Color tone | Display unevenness | Judgment |
| Example 1 | 1 pixel (A) | A | A | A | A |
| Example 2 | 0 pixel (A) | A | A | A | A |
| Example 3 | 0 pixel (A) | A | A | A | A |
| Example 4 | 0 pixel (A) | A | A | A | A |
| Example 5 | 0 pixel (A) | A | A | A | A |
| Example 6 | 0 pixel (A) | 2 white deletions (B) | A | A | A |
| Comparative example 1 | 20 pixels (C) | A | C | C | C |
| Comparative example 2 | 5 pixels (B) | A | C | C | C |
| Comparative example 3 | 0 pixel (A) | 3 white deletions (B) | C | A | C |

As can be seen from Table 11, both the color filter and the liquid crystal display device in each of Examples 1 to 6 are excellent.

The disclosure of Japanese Patent Application No. 2005-380197 is incorporated herein by reference.

The invention claimed is:

1. An ink comprising at least (1) a monomer and/or an oligomer and (2) a coloring agent, wherein the coloring agent comprises a pigment C.I.P.R. 254 and a pigment C.I.P.R. 177, the content of the C.I.P.R. 254 is 16% to 32% by mass based on the solid content of the ink, and the content of the C.I.P.R. 177 is 4 to 14% by mass based on the solid content of the ink, and the solid content of the ink is 50% by mass or more.

2. An ink comprising at least (1) a monomer and/or an oligomer and (2) a coloring agent, wherein the coloring agent comprises a pigment C.I.P.G. 36 and a pigment C.I.P.Y. 150, the content of the C.I.P.G. 36 is 27 to 49% by mass based on the solid content of the ink, and the content of the C.I.P.Y. 150 is 12 to 21% by mass based on the solid content of the ink, and the solid content of the ink is 50% by mass or more.

3. An ink comprising at least (1) a monomer and/or an oligomer and (2) a coloring agent, wherein the coloring agent comprises a pigment C.I.P.B. 15:6 and a pigment C.I.P.V. 23, the content of the C.I.P.B. 15:6 is 19 to 51% by mass based on the solid content of the ink, the content of the C.I.P.V. 23 is 1.2 to 2.3% by mass based on the solid content of the ink, and the solid content of the ink is 50% by mass or more.

4. A color filter comprising a red (R) pixel, a green (G) pixel and a blue (B) pixel, and deep-color separating walls for isolating the respective pixels from one another, wherein the ink used for formation of the red (R) pixel comprises at least (1) a monomer and/or an oligomer and (2) a coloring agent, wherein the coloring agent comprises a pigment C.I.P.R. 254 and a pigment C.I.P.R. 177, the content of the C.I.P.R. 254 is 16 to 32% by mass based on the solid content of the ink, and the content of the C.I.P.R. 177 is 4 to 8% by mass based on the solid content of the ink, and the solid content of the ink is 50% by mass or more, the ink used for formation of the green (G) pixel comprises at least (1) a monomer and/or an oligomer and (2) a coloring agent, wherein the coloring agent comprises a pigment C.I.P.G. 36 and a pigment C.I.P.Y. 150, the content of the C.I.P.G. 36 is 27 to 49% by mass based on the solid content of the ink, and the content of the C.I.P.Y. 150 is 12 to 21% by mass based on the solid content of the ink, and the ink used for formation of the blue (B) pixel comprises at least (1) a monomer and/or an oligomer and (2) a coloring agent, wherein the coloring agent comprises a pigment C.I.P.B. 15:6 and a pigment C.I.P.V. 23, the content of the C.I.P.B. 15:6 is 19 to 51% by mass based on the solid content of the ink, and the content of the C.I.P.V. 23 is 1.2 to 2.3% by mass based on the solid content of the ink.

5. A method for manufacturing a color filter, the method comprising forming deep-color separating walls on a substrate and discharging red (R), green (G) and blue (B) inks by an ink jet method onto concave portions enclosed by the deep-color separating walls to respectively form a red (R) pixel, a green (G) pixel and a blue (B) pixel on the concave portions, wherein the ink used for formation of the red (R) pixel comprises at least (1) a monomer and/or an oligomer and (2) a coloring agent, wherein the coloring agent comprises a pigment C.I.P.R. 254 and a pigment C.I.P.R. 177, the content of the C.I.P.R. 254 is 16 to 32% by mass based on the solid content of the ink, and the content of the C.I.P.R. 177 is 4 to 8% by mass based on the solid content of the ink, and the solid content of the ink is 50% by mass or more, the ink used for formation of the green (G) pixel comprises at least (1) a monomer and/or an oligomer and (2) a coloring agent, wherein the coloring agent comprises a pigment C.I.P.G. 36 and a pigment C.I.P.Y. 150, the content of the C.I.P.G. 36 is 27 to 49% by mass based on the solid content of the ink, and the content of the C.I.P.Y. 150 is 12 to 21% by mass based on the solid content of the ink, and the ink used for formation of the blue (B) pixel comprises at least (1) a monomer and/or an oligomer and (2) a coloring agent, wherein the coloring agent comprises a pigment C.I.P.B. 15:6 and a pigment C.I.P.V. 23, the content of the C.I.P.B. 15:6 is 19 to 51% by mass based on the solid content of the ink, and the content of the C.I.P.V. 23 is 1.2 to 2.3% by mass based on the solid content of the ink.

6. A display device comprising the color filter of claim 4.

7. An ink set comprising:
a first ink comprising at least (1) a monomer and/or an oligomer and (2) a coloring agent, wherein the coloring agent comprises a pigment C.I.P.R. 254 and a pigment C.I.P.R. 177, the content of the C.I.P.R. 254 is 16 to 32% by mass based on the solid content of the first ink, and the content of the C.I.P.R. 177 is 4 to 8% by mass based on the solid content of the first ink, and the solid content of the first ink is 50% by mass or more,
a second ink comprising at least (1) a monomer and/or an oligomer and (2) a coloring agent, wherein the coloring agent comprises a pigment C.I.P.G. 36 and a pigment C.I.P.Y. 150, the content of the C.I.P.G. 36 is 27 to 49% by mass based on the solid content of the second ink, and the content of the C.I.P.Y. 150 is 12 to 21% by mass based on the solid content of the second ink; and
a third ink comprising at least (1) a monomer and/or an oligomer and (2) a coloring agent, wherein the coloring agent comprises a pigment C.I.P.B. 15:6 and a pigment C.I.P.V. 23, the content of the C.I.P.B. 15:6 is 19 to 51% by mass based on the solid content of the third ink, and the content of the C.I.P.V. 23 is 1.2 to 2.3% by mass based on the solid content of the third ink.

8. An ink comprising at least (1) a monomer and/or an oligomer and (2) a coloring agent, wherein the coloring agent comprises a pigment C.I.P.R. 254 and a pigment C.I.P.R. 177, the content of the C.I.P.R. 254 is 16 to 56% by mass based on the solid content of the ink, and the content of the C.I.P.R. 177 is 4 to 8% by mass based on the solid content of the ink, and the solid content of the first ink is 50% by mass or more.

9. The ink of claim 1, wherein the content of the C.I.P.R. 254 is from 20 to 32% by mass based on the solid content of the ink.

10. The ink of claim 1, wherein the content of the C.I.P.R. 254 is from 24 to 32% by mass based on the solid content of the ink.

11. The ink of claim 1, wherein the content of the C.I.P.R. 177 is from 4 to 8% by mass based on the solid content of the ink.

12. The ink of claim 8, wherein the content of the C.I.P.R. 177 is from 5 to 8% by mass based on the solid content of the ink.

13. The ink of claim 8, wherein the content of the C.I.P.R. 177 is from 6 to 8% by mass based on the solid content of the ink.

14. The ink of claim 3, wherein the content of the C.I.P.V. 23 is from 1.3 to 2.0% by mass based on the solid content of the ink.

15. The ink of claim 3, wherein the content of the C.I.P.B. 15:6 is from 23 to 43% by mass based on the solid content of the ink.

16. The ink of claim 3, wherein the content of the C.I.P.B. 15:6 is from 25 to 38% by mass based on the solid content of the ink.

* * * * *